(12) United States Patent
Munro

(10) Patent No.: US 11,169,027 B2
(45) Date of Patent: Nov. 9, 2021

(54) INTERFEROMETER SYSTEMS AND METHODS THEREOF

(71) Applicant: Munro Design & Technologies, LLC, Ontario, NY (US)

(72) Inventor: James F. Munro, Ontario, NY (US)

(73) Assignee: MUNRO DESIGN & TECHNOLOGIES, LLC, Ontario, NY (US)

( * ) Notice: Subject to any disclaimer, the term of this patent is extended or adjusted under 35 U.S.C. 154(b) by 0 days.

(21) Appl. No.: 16/699,571

(22) Filed: Nov. 30, 2019

(65) Prior Publication Data

US 2020/0173855 A1 Jun. 4, 2020

Related U.S. Application Data

(60) Provisional application No. 62/773,584, filed on Nov. 30, 2018, provisional application No. 62/798,284, filed on Jan. 29, 2019.

(51) Int. Cl.
*G01J 3/28* (2006.01)
*G01J 3/02* (2006.01)
(Continued)

(52) U.S. Cl.
CPC .......... *G01J 3/2823* (2013.01); *G01J 3/021* (2013.01); *G01J 3/0205* (2013.01);
(Continued)

(58) Field of Classification Search
CPC ...... G01J 3/2823; G01J 3/0205; G01J 3/0208; G01J 3/021; G01J 3/0262; G01J 3/10;
(Continued)

(56) References Cited

U.S. PATENT DOCUMENTS 5,675,414 A * 10/1997 Rowell .............. G02B 27/1073
356/451
5,785,651 A 7/1998 Kuhn et al.
(Continued)

OTHER PUBLICATIONS

Protopopov, Vladimir. "A compact wide-range spectrometer with image intensifier: unexpected advantages, new functions, and a variety of applications." Applied spectroscopy 66.5 (2012): 496-509. (Year: 2012).*

(Continued)

*Primary Examiner* — Dominic J Bologna
(74) *Attorney, Agent, or Firm* — Troutman Pepper Hamilton Sanders LLP (Rochester)

(57) ABSTRACT

An interferometer system includes a measurement arm comprising a measurement dispersive optical system, a reference arm comprising a bulk diffuser object and a reference dispersive optical system, and an output system. The measurement dispersive optical system is positioned to direct measurement chromatic light towards a target, receive diverging chromatic measurement light from the target, and direct detected measurement light from the received diverging chromatic measurement light towards the output system. The reference dispersive optical system is positioned to direct reference chromatic light towards the bulk diffuser object, receive diverging chromatic reference light from the bulk diffuser object, and direct detected reference light from the received diverging chromatic reference light towards the output system. The output system is configured to determine at least one measured property of the target from the detected measurement light and the detected reference light.

16 Claims, 12 Drawing Sheets

(51) Int. Cl.
*G01J 3/10* (2006.01)
*G01J 3/45* (2006.01)

(52) U.S. Cl.
CPC .......... *G01J 3/0208* (2013.01); *G01J 3/0262* (2013.01); *G01J 3/10* (2013.01); *G01J 3/45* (2013.01)

(58) Field of Classification Search
CPC ... G01J 3/45; G01B 9/02015; G01B 9/02021; G01B 9/02017
See application file for complete search history.

(56) References Cited

U.S. PATENT DOCUMENTS

| | | | | |
|---|---|---|---|---|
| 6,091,075 | A * | 7/2000 | Shibata | G02B 21/241 250/559.44 |
| 7,349,103 | B1 * | 3/2008 | Balooch | G01J 3/10 356/601 |
| 7,486,394 | B2 | 2/2009 | Lehmann et al. | |
| 7,876,446 | B2 | 1/2011 | Komer et al. | |
| 10,018,686 | B1 * | 7/2018 | Bickford | G01R 33/0047 |
| 2006/0114457 | A1 * | 6/2006 | Schmitz | G01J 3/10 356/319 |
| 2006/0171503 | A1 * | 8/2006 | O'Hara | A61B 5/0066 378/21 |
| 2007/0291277 | A1 * | 12/2007 | Everett | G01N 21/4795 356/497 |
| 2011/0216324 | A1 * | 9/2011 | Arieli | G01J 3/447 356/453 |
| 2013/0044313 | A1 * | 2/2013 | Rolland | G01J 3/0208 356/51 |
| 2014/0192365 | A1 * | 7/2014 | Mortada | G02B 27/14 356/521 |
| 2015/0338202 | A1 * | 11/2015 | Xiang | G01B 9/0209 356/477 |
| 2018/0084991 | A1 * | 3/2018 | Shibutani | A61B 3/0033 |
| 2019/0120757 | A1 * | 4/2019 | Watanabe | G01N 21/3586 |
| 2020/0221551 | A1 * | 7/2020 | Sawanami | G01N 21/8806 |

OTHER PUBLICATIONS

Pavlíček, Pavel, and Gerd Häusler. "White-light interferometer with dispersion: an accurate fiber-optic sensor for the measurement of distance." Applied optics 44.15 (2005): 2978-2983. (Year: 2005).*

Körner, K. et al., "Some aspects of chromatic confocal spectral interferometry," XVIII Imeko World Congress, Sep. 2006.

Lyda, W. et al., "Advantages of chromatic-confocal spectral interferometry in comparison to chromatic confocal microscopy," The 10th International Symposium of Measurement Technology and Intelligent Instruments, Jun. 2011.

Debnath, S. K. et al., "Evaluation of spectral phase in spectrally resolved white-light interferometry: Comparative study of single-frame techniques," Optics and Lasers in Engineering, vol. 47 (2009) 1125-1130.

* cited by examiner

INTERFEROMETER SYSTEMS AND METHODS THEREOF

This application claims the benefit of U.S. Provisional Patent Application Ser. No. 62/773,584, filed Nov. 30, 2018, and claims the benefit of U.S. Provisional Patent Application Ser. No. 62/798,284, filed Jan. 29, 2019, which are all hereby incorporated by reference in their entirety.

FIELD

This technology generally relates to systems and methods for measuring a property of a test sample, for measuring the displacement of a surface with high accuracy over a long measurement range, and for measuring displacement and depth of artifacts within a test sample volume.

BACKGROUND

Areal surface interferometry, including areal phase-measuring interferometry, has been used to measure the shape or form of optical surfaces for several decades. While generally quite fast and accurate, prior areal surface interferometry suffers from errors—such as retrace errors—and also introduces unexpected costs and complexities in the surface metrology process.

For example, areal interferometers often depend on test spheres and null correctors, and an error in their fabrication can result in later errors in the surface topography measurement results. In this example, the infamous surface errors in the primary mirror of the Hubble Space Telescope have been traced to problems with a null corrector. Since that time NASA—and associated manufacturers of large optics—have been seeking non-areal yet non-contact approaches for high-precision surface metrology. Generally, these approaches have entailed the use of an optical probe system that measures displacement of a surface at a given location, and the probe is then scanned across the surface of interest to generate a complete surface profile One such prior art optical probe is the chromatic probe 10 as shown FIG. 1. As seen in FIG. 1, a broadband light source 12 produces light that is routed to chromatic probe body 20 through source fiber optic 14, fiber coupler 16, and probe fiber optic 18. Light then exits probe fiber optic 18 in chromatic probe body 20 and enters collimating lens 24 which collimates the light; the collimated light then enters chromatic lens 26 which causes the collimated light to become focused in a spectrally dispersed manner as chromatic light 28.

Note that the focal position of the chromatic light 28 on optical axis 22 is a function of wavelength, with shorter wavelengths generally coming to a focus closer to chromatic probe body 20 than the longer wavelengths. A test surface 90 of unknown displacement relative to probe body 20 is positioned within the focal field of chromatic light 28 such that one of the wavelengths within chromatic light 28 is well-focused on test surface 90 at measurement spot 30.

Next, a portion of chromatic light 28 is reflected from test surface 90, and re-enters chromatic lens 26 and is re-collimated as it exits chromatic lens 26. The re-collimated light re-enters collimating lens 24 which then focuses the light reflected from test surface 90 onto the aperture of probe fiber optic 18 where a substantial portion of the light passes through the aperture and enters probe fiber optic 18. The same light then propagates through probe fiber optic 18 to fiber coupler 16 where approximately half of the light is coupled into the output fiber optic 32 through which light is coupled to an input of spectrograph 34. The spectrograph 34 spectrally disperses the light and presents an image of the dispersed light on the image sensor of camera 36. The image sensor of the camera captures the spectral image and transmits the spectral image to the digital processor 40 as an electronic signal through camera output line 38. The digital processor 40 analyzes the electronic spectral image to determine the displacement of surface 90 and outputs the displacement information to a user through the chromatic probe output 42.

Chromatic probes, such as chromatic probe 10, have been available in the market for several years, and are fast and relatively inexpensive. However, because the spectral image within the spectrograph 34, captured by the camera 36 and then processed by the digital processor 40 is a simple Gaussian curve with only one inflection point and low-slope tails, the processing will necessarily lead to a poor and inadequate determination of the central wavelength of light at the spectrograph 34. An inadequate determination of the central wavelength of light will lead to a poor and inadequate estimate of the displacement. Typically, these instruments have displacement measurement accuracies on the order of 100 nanometers at best. Further, these instruments do not perform well when the test surface is polished and tilted at a high angle relative to chromatic light as very little light will be reflected back from the test surface 90 to the chromatic lens 26, and the subsequent spectral image captured by the camera 36 will be dark and non-processable by the digital processor 40, and the displacement measurement will fail.

An alternate displacement measuring device, a spectral interferometric probe 50 is shown in FIG. 2. The spectral interferometric probe 50 has a broadband light source 52 that emits light that is subsequently collimated by collimating lens 54 which then enters a beamsplitter 56. The beamsplitter 56 reflects a portion of the collimated light beam to enter a chromatic lens 68 that focuses the light in such a way that its focal position along an optical axis 58 varies with wavelength. This converging chromatic light then strikes a second beamsplitter 61 which further divides the beam into a reference beam, shown reflecting to the left in FIG. 2 towards a reference mirror 64, and a test beam shown propagating downward through the second beamsplitter 61 towards a test surface 90. Note that the chromatic lens 68, the second beamsplitter 61, and the reference mirror 64 are located within the measurement head 60, which in turn is coupled to a linear piezo-electric transducer stage 62. The linear piezo-electric transducer stage 62 can cause the measurement head 60, and its internal constituents, to move along the optical axis 58 closer to or further away from the test surface 90. Light reflected from the reference mirror 64 and the test surface 90 (at measurement spot 66) both reflect back to the second beamsplitter 61 and then both re-enter the chromatic lens 68 which then re-collimates the two light beams.

The two re-collimated light beams then pass through the beamsplitter 56, enter the focusing lens 70, and then enter the spectrograph 72 through a small aperture at the focal point of the focusing lens 70. The two re-collimated beams then form a spectral interference pattern on the image sensor of the camera 74 associated with the spectrograph 72, where the resulting spectral interference fringe pattern is quite similar to the wavelet illustrated in FIG. 8. The resulting spectral interference fringe pattern has several inflection points and high-slope regions for improved downstream processing and fitting by the digital processor 76.

Under these conditions, the displacement can be found quite accurately, to less than a nanometer, and is a particular strength of the spectral interferometric probe 50. A second strength is that if the measurement test light reflected from the test surface 90 is weak (perhaps because the test surface 90 is highly polished and tilted) then the interferometric gain present in the interference pattern provides a means of intensifying the weak optical signal so that it is of sufficient brightness to be image-able by the spectrograph 72 and to be processed by the digital processor 76.

Unfortunately, a serious drawback of the spectral interferometric probe 50 is that the optical path lengths of the reference arm and the measurement arm in this example are substantially equal in order to obtain interference fringes at the image sensor of the camera 74. Since the optical path length, or equivalently the displacement, associated with the test surface 90 is unknown, then the position of the reference mirror in this example is scanned, or equivalently, the reference arm is not scanned and instead the whole measurement head 60 is scanned by virtue PZT 60 until a scanning position is found that produces the desired interference fringes. This scanning process requires a significant amount of time and limits the measurement throughput rate of spectral interferometer probe 50 to about 100 displacement measurement per second.

SUMMARY

An interferometer system includes a measurement arm comprising a measurement dispersive optical system, a reference arm comprising a bulk diffuser object and a reference dispersive optical system, and an output system. The measurement dispersive optical system is positioned and configured to direct measurement chromatic light towards a target, receive diverging chromatic measurement light from the target, and direct detected measurement light from the received diverging chromatic measurement light towards the output system. The reference dispersive optical system is positioned and configured to direct reference chromatic light towards the bulk diffuser object, receive diverging chromatic reference light from the bulk diffuser object, and direct detected reference light from the received diverging chromatic reference light towards the output system. The output system is configured to determine at least one measured property of the target from the detected measurement light and the detected reference light.

A method for making an interferometer system includes positioning a measurement arm comprising a measurement dispersive optical system to direct measurement chromatic light towards a target, receive diverging chromatic measurement light from the target, and direct detected measurement light from the received diverging chromatic measurement light towards an output system. A reference arm comprises a bulk diffuser object and a reference dispersive optical system which is positioned to direct reference chromatic light towards the bulk diffuser object, receive diverging chromatic reference light from the bulk diffuser object, and direct detected reference light from the received diverging chromatic reference light towards the output system. The output system is configured to determine at least one measured property of the target from the detected measurement light and the detected reference light.

Accordingly, examples of the claimed technology provide a number of advantages including providing a displacement measurement system that has the fast displacement measurement rate of a chromatic probe, the high accuracy of a spectral interferometer probe, and the ability of a spectral interferometer probe to measure displacement of uncooperative surfaces.

DETAILED DESCRIPTION

Figure 1:
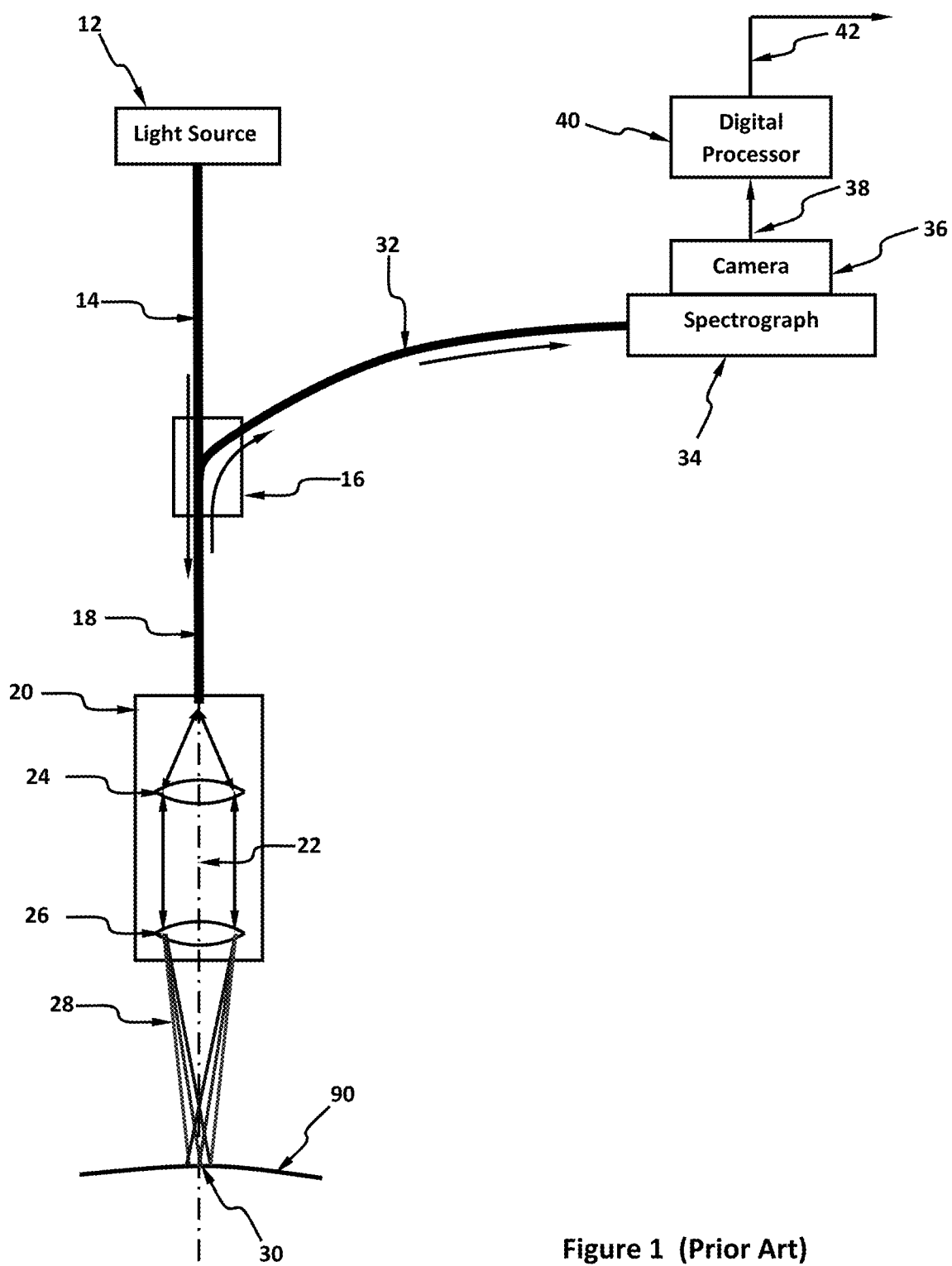
FIG. 1 is a block diagram of a prior art confocal chromatic displacement measuring system.
Figure 2:
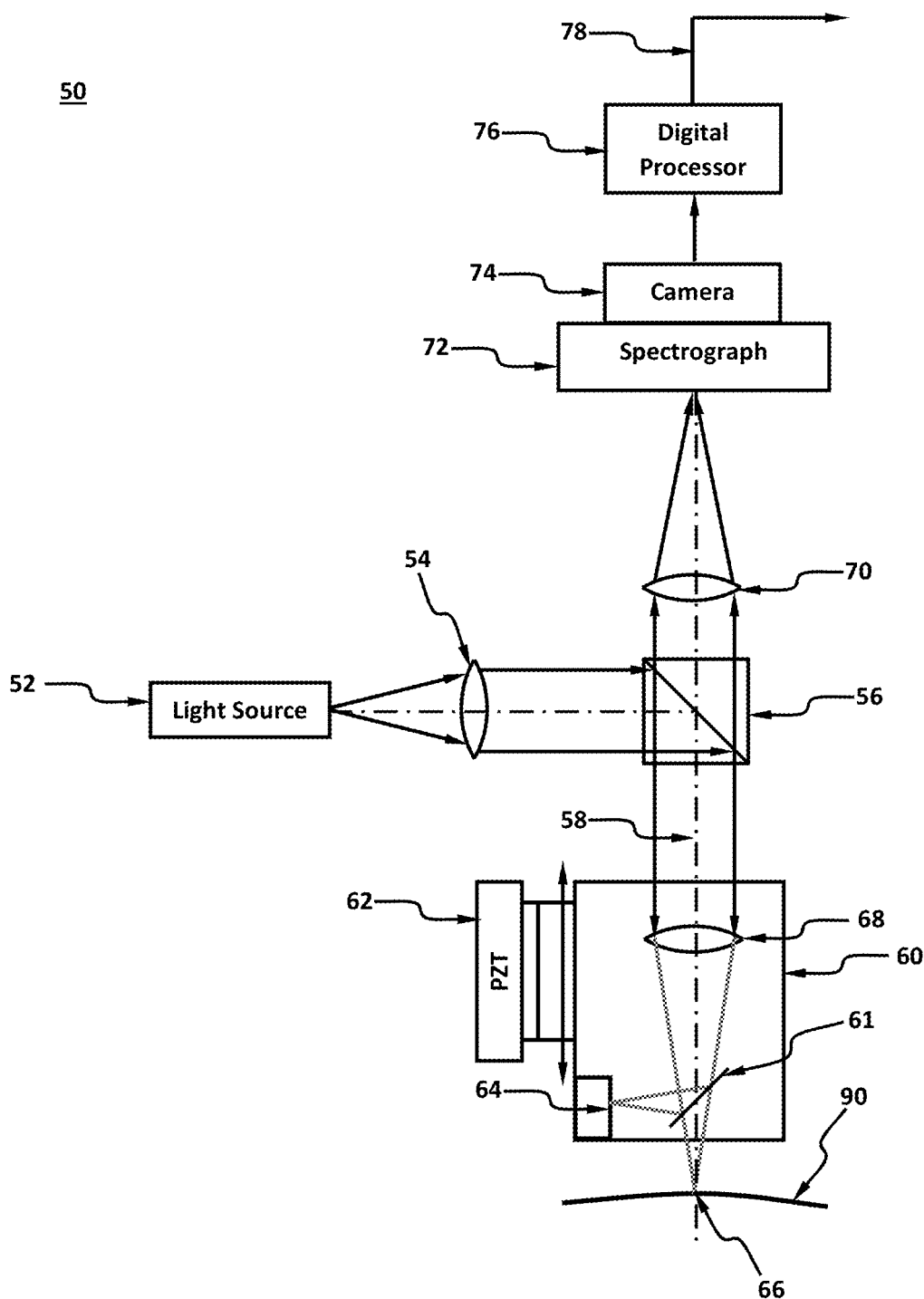
FIG. 2 is a block diagram of a prior art confocal chromatic spectral interferometric displacement measuring system.

An interferometer system 100 in accordance with examples of the claimed technology is illustrated in FIGS. 3-5B. In this example, the interferometer system 100 comprises a laser driver 102, a fiber laser 104, a filter assembly 106, an interferometer 150, an output fiber 114, a spectrograph 116, a camera 118, a digital processing system 120 and an interferometer system output 122, although the interferometer system 100 may have other types and/or numbers of other components and/or other elements in other configurations. The claimed technology provides a number of advantages including providing a displacement measurement system that has the fast displacement measurement rate of a chromatic probe, the high accuracy of a spectral interferometer probe, and the ability of a spectral interferometer probe to measure displacement of uncooperative surfaces.

Figure 3:
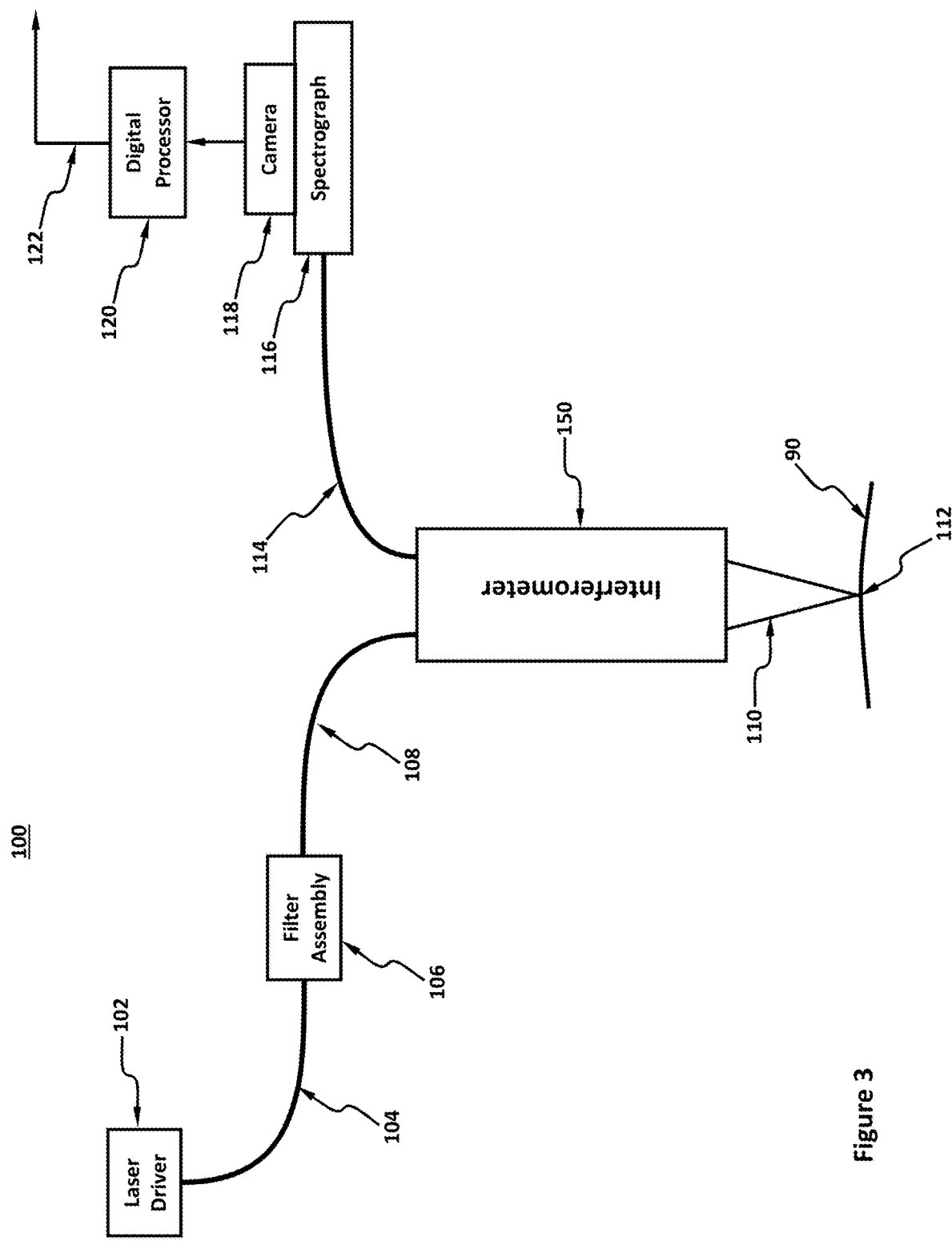
FIG. 3 is a block diagram of an example of a spectral interferometer system with a single test surface.

Referring more specifically to FIG. 3, the laser driver 102 has an output coupled to a fiber laser 104 whose light output is coupled to an input of filter assembly 106, although other components and/or elements in other configurations may be used. The laser driver 102 and the fiber laser 104 together comprise a broadband light source whose output is through a small-diameter aperture at the end of fiber laser 104, although other types of light sources may be used. In one example, the laser driver 102 and the fiber laser 104 are a so-called white-light laser, more technically known as a supercontinuum laser, although other types of white light or other broadband light sources, such as those that utilize LEDs or incandescence by way of example, can be used.

In this example, the requirements and characteristics of the light source are: (1) that the output light pass through a small-diameter aperture; (2) that as much optical flux passes through the output aperture as possible; and (3) that the output photon flux is broad-band, although other types and/or numbers of requirements and/or characteristics of the light source may be used in other examples. For example, typically the fiber laser 104 is a single-mode fiber and has a core diameter—and exit aperture diameter—of less than 10 µm, and in some example preferably less than or equal to 5 µm. As will be seen later, smaller apertures generally yield better displacement-measuring performance. The optical flux exiting the fiber laser 104 in this example should be as great as possible, being at least than 100 µW/nm, or in some examples advantageously at least 200 µW/nm, or in other examples advantageously greater than 1 mW/nm. Finally, in this example the spectrum of the light exiting the light source is broadband, and also of a wavelength range that the downstream image sensor of the camera 118 is responsive to. In particular, in this example light in the range of 450 nm to 650 nm is advantageous, while light from 400 nm to 800 nm is even more advantageous, although in other examples other ranges may be preferred.

Figure 7:
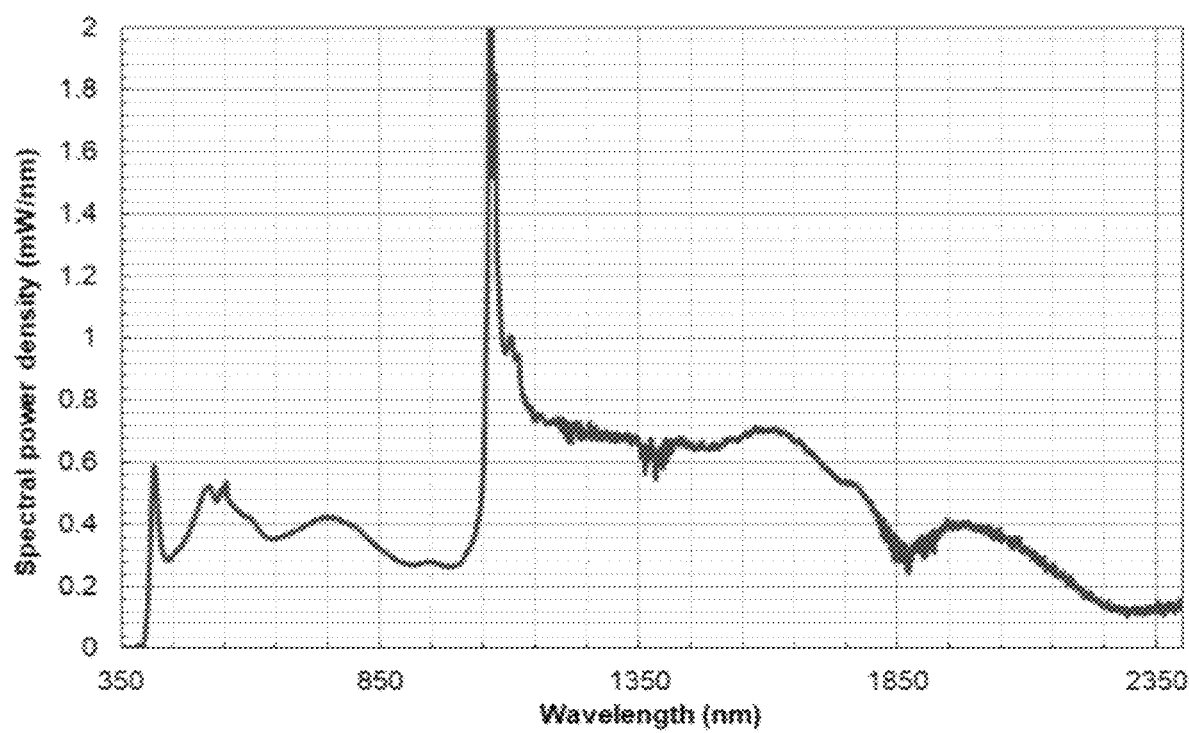
FIG. 7 is a spectral plot of an example of light output by a supercontinuum laser.

One of ordinary skill in the art will appreciate that the laws of etendue generally restrict the ability of a light source to output relatively large spectral flux values. However, in this example a laser driver 102 and a fiber laser 104 comprising a supercontinuum laser can economically meet these flux emission values with a small (e.g., 5 µm diameter) aperture as well as the desired wavelength range. By way of example, FIG. 7 shows the spectral output of a typical supercontinuum laser can exceed 100 µW/nm over the entire 400 nm to 800 nm spectral range. Note that the spectral output of the supercontinuum laser shown in FIG. 7 also includes significant amounts of light above 800 nm. Unfortunately these wavelengths of light are generally not needed or used by examples of the claimed technology, but instead, if not removed, can propagate into the interferometer 150 and be absorbed by components or surfaces inside the interferometer 150 thereby generating heat and internal thermal gradients. Since these internal thermal gradients can cause poor displacement measuring performance, it is desirable to filter these longer wavelengths or otherwise prevent them from entering the interferometer 150.

The filter assembly 106 has an input coupled to an output of the fiber laser 104 and an output coupled to a source fiber 108, although other components and/or elements in other configurations may be used. The filter assembly 106 has provisions for filtering the unwanted wavelengths from the light output from fiber laser 104, although other types of filters may be used. In other examples, the filter assembly 106 may also have provisions for filtering unwanted polarizations from the light output from the fiber laser 104 and for ensuring that the polarization passing through the filter assembly 106 and into the source fiber 108 is of a known polarization state and orientation, although the filter assembly may have other types and/or numbers of provisions. Such polarization filtering is necessary in this example because the quality of the optical interference occurring within the interferometer 100, i.e., the contrast of the resulting interference fringes at the image sensor of the camera 118, is a strong function of the polarization states of the two interfering light beams.

The source fiber 108 is used to couple the filtered light output by the filter assembly 106 to an input of interferometer 150, which in this example is the source arm of the interferometer 150, although other components and/or elements in other configurations may be used. The source fiber 108 is in some example preferably a single-mode fiber, having a core diameter less than 10 µm, or in some example preferably less than 5 µm, and transmits all wavelengths of light that are used by interferometer 150, such as 400 nm to 800 nm, to the interferometer with minimal attenuation. Additionally, since the light output by the filter assembly 106 can be polarized, the source fiber 108 has polarization-preserving or polarization-maintaining properties. Further, since the laser driver 102 and the fiber laser 104 are the heat-generating, in this example the laser driver 102 and the fiber laser 104 are placed a sufficient distance from interferometer 150 so the performance of interferometer 150 is not affected by this hear generating source. In this example the length of the source fiber 108 is at least one meter to provide the sufficient distance, or in other examples at least two meters, provided the length does not significantly attenuate any of the wavelengths transmitted by the source fiber 108.

The interferometer 150 is a device for creating spectral interfering beams of light. In this example, the interferometer 150 outputs chromatic light 110 that is used as part of an interferometric process for determining a displacement of a test surface 90 at a measurement spot 112.

Figure 4:
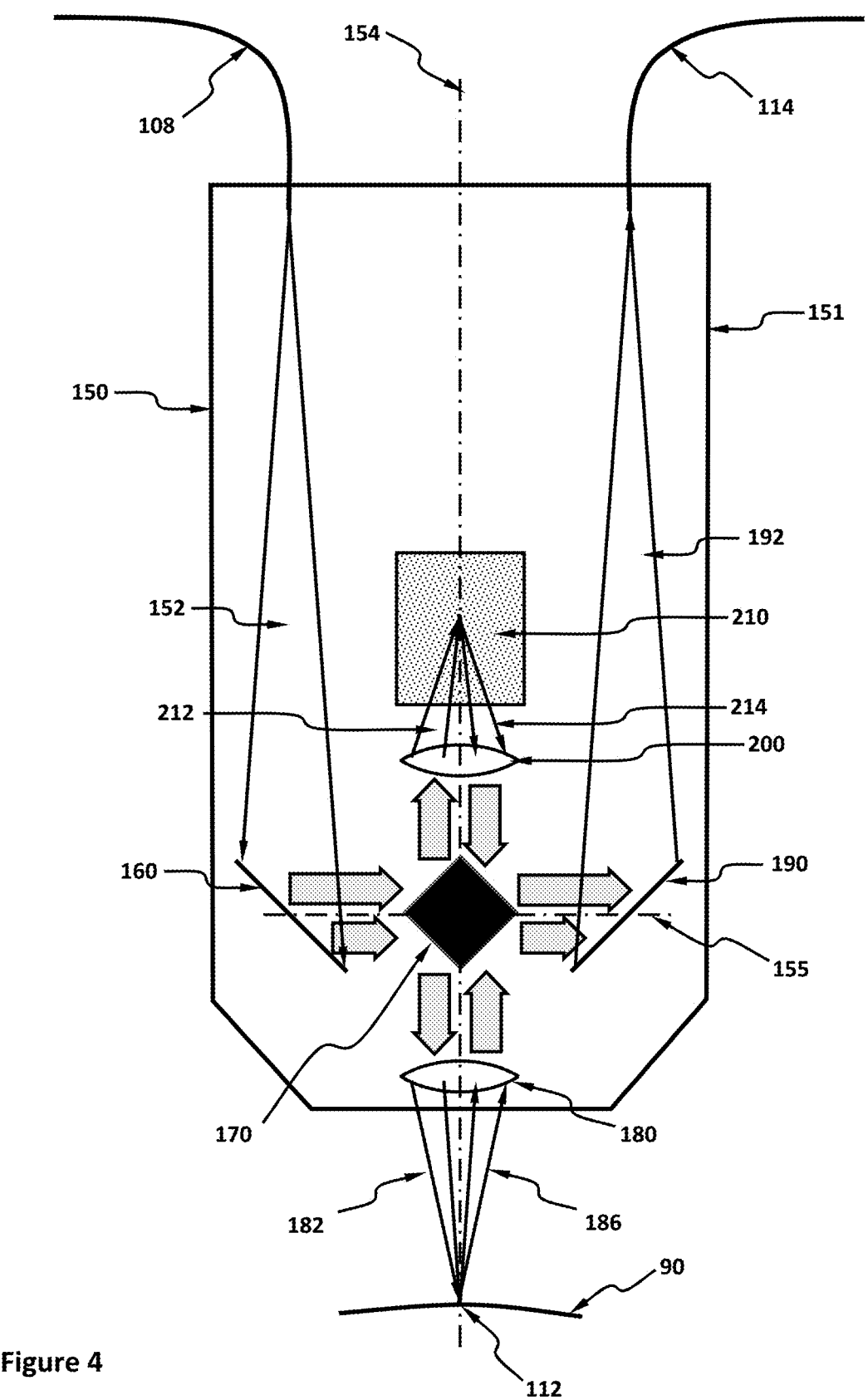
FIG. 4 is a diagram of an example of a spectral interferometer in the spectral interferometer system shown in FIG. 3.
Figure 5A:
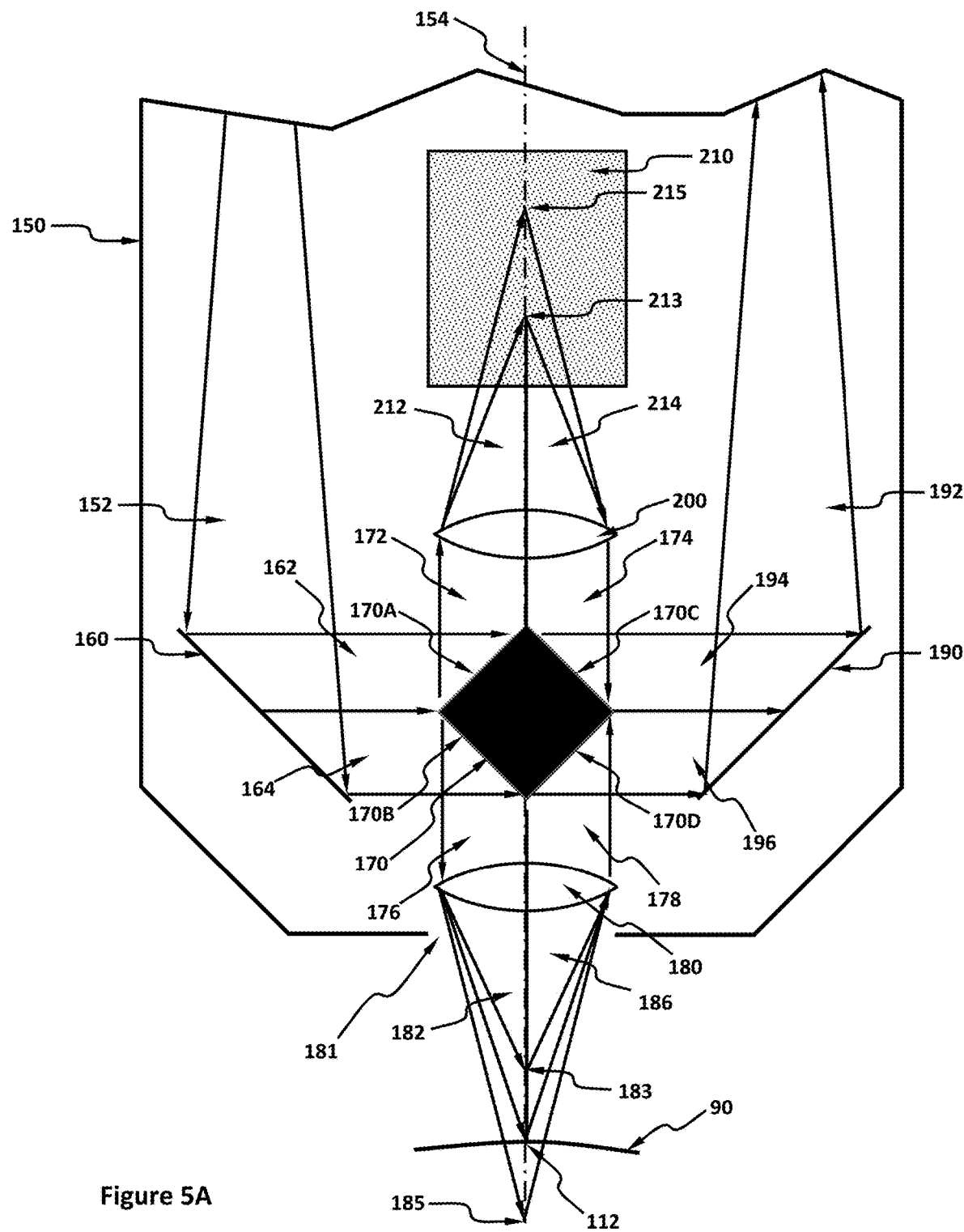
FIG. 5A is an enlarged view of a diagram of the example of the spectral interferometer shown in FIG. 4.
Figure 5B:
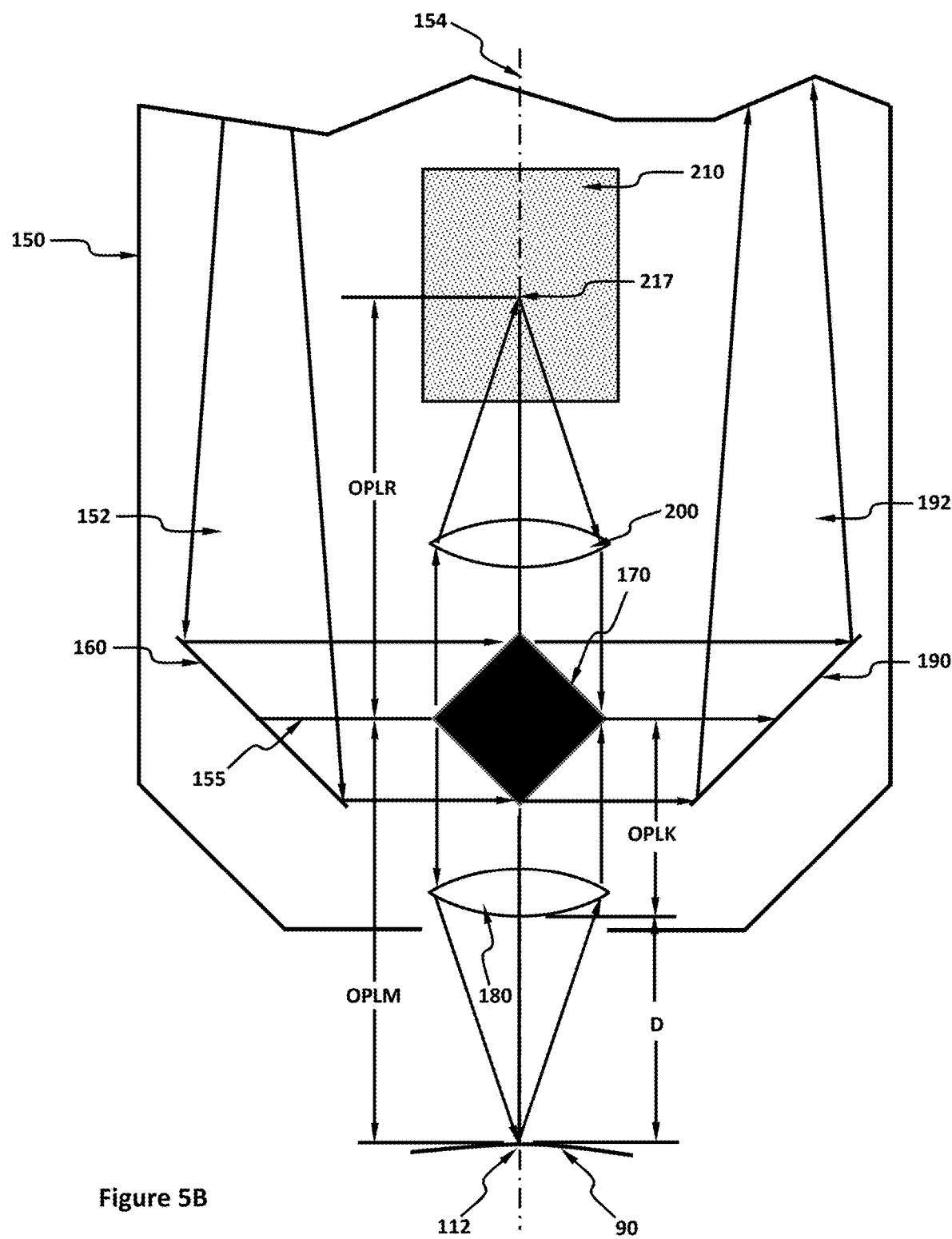
FIG. 5B is an enlarged view of a diagram of the example of the spectral interferometer shown in FIG. 4 illustrating an optical path difference.

Referring to FIGS. 4, 5A, and 5B, a more detailed view of an example of the interferometer 150 of the interferometer system 100 from FIG. 3 is illustrated. The interferometer 150 may comprise a housing 151 in which is placed a source right angle parabolic mirror (RAPM) 160, a beamsplitter 170, a measurement arm chromatic lens 180, an output RAPM 190, a reference arm chromatic lens 200, and a reference block 210, although the interferometer 150 may comprise other types and/or numbers of components and/or other elements in other configurations.

In this example, the interferometer 150 has a source arm, a reference arm, an output arm, and a measurement arm, although the interferometer may comprise other types and/or numbers of arms, components and/or other elements in other configurations. The source arm of the interferometer 150 is where light is introduced into the interferometer 150. The source arm of interferometer 150 includes an output end or aperture of the source fiber 108 and the source RAPM 160, although the source arm may comprise other types and/or numbers of components and/or other elements in other configurations.

The reference arm of the interferometer 150 has optics that produce a relatively known optical signal. The reference arm of the interferometer 150 may comprise the reference arm chromatic lens 200 and the reference block 210, although the reference may comprise other types and/or numbers of components and/or other elements in other configurations.

The measurement arm of the interferometer 150 has optics that produces a relatively unknown optical signal carrying information about an unknown property of a test surface 90 or test object. The measurement arm comprises the measurement arm chromatic lens 180 and a test surface 90 (external to interferometer 150), although the measurement arm may comprise other types and/or numbers of components and/or other elements in other configurations.

The output arm of the interferometer 150 carries the combined reference arm optical signal and measurement arm optical signal downstream to the spectrograph 116, the camera 118, and digital processor system 120. The output arm of the interferometer 150 comprises the output RAPM 190 and the input end or aperture of output fiber 114, although the output arm may comprise other types and/or numbers of components and/or other elements in other configurations.

The housing 151 in this example is a mechanical component which houses or encloses, and on which are mounted (either directly or through additional mechanical coupling, mounting, and/or positional adjustment components) the output end of the source fiber 108, the source RAPM 160, the beamsplitter 170, the measurement arm chromatic lens 180, the output RAPM 190, the reference arm chromatic lens 200, the reference block 210, and the input end of the output fiber optic 114, although other mounting configurations with other types and/or numbers of elements may be used. The housing 151 is made of a material having a low CTE (coefficient of thermal expansion) so that one or more of the output end of the source fiber 108, the source RAPM 160, the beamsplitter 170, the measurement arm chromatic lens 180, the output RAPM 190, the reference arm chromatic lens 200, the reference block 210, and the input end of the output fiber optic 114 do not move relative to one another as the ambient temperature varies which can in turn cause erroneous displacement measurements. In this example, the housing 151 can be made of Invar, a metal alloy having an exceptionally low CTE, or a glass or glass/ceramic such as Zerodur or ULE which also have low CTE's, although other types and/or numbers of materials may be used. Additionally, the housing 151 in this example completely encloses the source RAPM 160, the beamsplitter 170, the measurement arm chromatic lens 180, the output RAPM 190, the reference arm chromatic lens 200, and the reference block 210 while leaving open the optical aperture 181 associated with the measurement arm chromatic lens 180 and may also be optically opaque so that stray ambient light does not affect the performance of interferometer 150 and cause erroneous displacement measurements. Further, an interior surface of the housing 151 may be painted or otherwise coated with a light absorbing material—with light-trapping surface properties—such as a heavily textured black paint, to absorb any stray light that may inadvertently enter into the housing 151 from the outside, or inadvertently generated from inside the housing 151.

The source RAPM 160 functions to collimate the diverging source light 152 and reflect the collimated light into a direction that causes it to be incident on the input surfaces 170A and 170B of the beamsplitter 170. Since the collimation occurs over a broad spectral range, in this example a reflective optic (which has no dispersion) is preferred over a refractive optical element. Further, the source RAPM 160 in this example is located at some distance from the exit aperture of the source fiber 108 so that the diffracting light exiting the exit aperture of the source fiber 108 has expanded enough to substantially fill the reflecting surface of the source RAPM 160. In this example, the distance from the exit aperture of the source fiber 108 to the source RAPM 160 to substantially fill the reflecting surface of the source RAPM 160 can be between 25 mm and 300 mm, with 100 mm being a typical distance, although in other examples other distances may be used. For the light reflected from the source RAPM 160 to be collimated, the exit aperture of the source fiber 108 in this example is located at the focal point of the source RAPM 160, meaning the focal length of the source RAPM 160 is between 25 mm and 300 mm, with 100 mm being a typical focal length, although again in other examples other distances may be used. The diameter of the source RAPM 160 can be between 5 mm and 50 mm, although the RAPM can have other dimensions in other examples. In this example, the operative parabolic surface of the source RAPM 160 can be made reflective by the use of a reflective coating, the coating being metallic or dielectric, or the substrate of the source RAPM 160 can be a reflective metal, such as aluminum, that is polished to the correct optical prescription. If the reflector of the source RAPM 160 is a reflective metal, such as aluminum, silver, or gold, then in this example the reflector of the source RAPM 160 can be over-coated with a protective layer of SiO or SiO2. In this example, the reflectance of the reflective surface of the source RAPM 160 is at least 90% over the spectral band of interest, or, in some example greater than 95%, although other percentages may be used in other examples. The substrate of the source RAPM 160 can be a metal such as aluminum or steel, or a non-metallic material, such as glass, or even a specialized low-CTE material, such as Zerodur or Invar or other material having a CTE of less than 1 ppm per degree K, although other types and/or numbers of materials may be used in other examples.

The beamsplitter 170 is a six-sided optical object that is substantially shaped like a parallelepiped, although other types and/or numbers of beamsplitters and/or other prisms may be used in other examples. Four of the six beamsplitter surfaces, 170A, 170B, 170C, 170D, are substantially planar, highly polished, and specularly reflective. The remaining two sides (substantially square and parallel to a plane of the viewing perspective shown in FIGS. 4, 5A and 5B) are generally unused, but can be planar as well, although having a surface texture that prevents them from being specularly reflective (In this example, the two unused sides are generally coated with a light-absorptive material). Two of the reflective sides, the surfaces 170A and 170B, face the source RAPM 160 and are used to reflect collimated light from the source RAPM 160 into the reference arm (via surface 170A) and into the measurement arm (via surface 170B). The two other reflective sides, surfaces 170C and 170D, face the output RAPM 190 and are used to reflect collimated light from the reference arm to the output RAPM 190 (via surface 170C) and from the measurement arm to the output RAPM 190 (via surface 170D).

The substrate of the beamsplitter 170 can be a metal, such as aluminum or steel, or a non-metallic material, such as glass, or even a low CTE material such as Zerodur or Invar, although other types and/or numbers of materials may be used in other examples. The four reflective surfaces, 170A, 170B, 170C, and 170D, can be between 2 mm and 20 mm across and between 2 mm and 20 mm in length, and can be polished to flatness better than 0.1 μm peak-to-valley. Additionally, the intersection between two adjacent surfaces (e.g., between surface 170A and 170B) can be dead-sharp, or at least having an edge radius of less 10 μm to minimize stray light and maximize the optical utilization of the adjoining surfaces. The four reflective surfaces, 170A, 170B, 170C, and 170D, of the beamsplitter 170 can be made reflective by the use of a reflective coating, the coating being metallic or dielectric, or the substrate of beamsplitter 170 can be a reflective metal, such as aluminum, that is highly polished. If the reflector of beamsplitter 170 is a reflective metal, such as aluminum, silver, or gold, then in this example the reflector of beamsplitter 170 can be over-coated with a protective layer of SiO or SiO2. In this example, the reflectance of the four reflective surfaces 170A, 170B, 170C, and 170D, of the beamsplitter 170 is at least 90% over the spectral band of interest, or, in some example preferably greater than 95%. The central beamsplitter 170 is shared among the source arm, reference arm, measurement arm and output arm, and its reflective surfaces are used to reflect light into and out of the four arms as described herein.

In this example, the measurement arm chromatic lens 180 is a spectrally dispersive optical element that causes collimated measurement input light 176 incident upon the measurement arm chromatic lens 180 to be transmitted through the measurement arm chromatic lens 180 in such a way that the light comes to a sharp focus substantially on the optical axis 154. Being refractive, longer wavelengths are generally brought to a sharp focus further from the measurement arm chromatic lens 180 than the shorter wavelengths. The distance between the focal points at a longer wavelength (such as 800 nm) and a shorter wavelength (such as 400 nm) can be between 0.01 mm and 100 mm, and in this example it is highly desirable that the relationship between focal distance and wavelength is a substantially linear relationship. The measurement arm chromatic lens 180 can be a singlet lens element, such as a meniscus lens, and can have a prescription wherein a surface is planar, spherical, or aspherical, and be concave or convex if non-planar, although the measurement arm chromatic lens 180 can comprise other types and/or numbers of lens elements with other configurations, such as six or more lens elements, being typically positioned substantially centered on the optical axis 154 by way of example. The measurement arm chromatic lens 180 can also be a free-form lens, although in this example the measurement arm chromatic lens 180 is not free-form and has rotational symmetry about the optical axis 154.

One example of the measurement arm chromatic lens 180 results in a 1 mm chromatic working range (i.e., maximum to minimum measurement range) at a distance of 13.5 mm from the output surface of chromatic lens 180. In this example, the chromatic lens 180 is a singlet lens in which the input surface is aspherical with a base radius of curvature of 10.274 mm and a −0.356105 conic constant, the output surface is spherical with a 35.419 mm radius of curvature, a center thickness of 3.5 mm, and is comprising S-TIH3 glass from Ohara Inc., (Kanagawa, Japan). Alternately, instead of the chromatic lens 180, the spectrally dispersive optical element in the measurement arm of the interferometer 150 can be a diffractive optical element (DOE), such as a holographic optical element (HOE) or even a computer generated holographic optical element.

The output RAPM 190 functions to focus the collimated output light incident on the output RAPM 190 from the beamsplitter 170 and reflect the resulting converging output light 192 into a direction that causes it to be incident on the entrance aperture of output fiber 114. Since the focusing occurs over a broad spectral range, a reflective optic (which has no dispersion) is preferred over a refractive optical element. Additionally, the output RAPM 190 in this example is located at a distance from the entrance aperture of output fiber 114 so that the focusing can occur over a distance, such as 50 mm by way of example only. Further, for mechanical symmetry (which can mitigate spurious mechanical component positional movements due to thermal gradients) the distance from the output RAPM 190 to the entrance aperture of the output fiber 114 is in some example preferably the same as that distance from the exit aperture of the source fiber 108 to the surface of the source RAPM 160. The distance from the output RAPM 190 to the entrance aperture of the output fiber 114 can be between 25 mm and 300 mm, with 100 mm being a typical distance, although other distances may be used in other examples. For the light reflected from the output RAPM 190 to be focused onto the entrance aperture of the output fiber 114, the entrance aperture of the output fiber 114 in this example is located at the focal point of the output RAPM 190, meaning the focal length of the output RAPM 190 is between 25 mm and 300 mm, with 100 mm being a typical focal length, although other distances may be used in other examples. A width of the output RAPM 190 can be between 5 mm and 50 mm, although other distances may be used in other examples.

The operative surface of the output RAPM 190 can be made reflective by the use of a reflective coating, the coating being metallic or dielectric, or the substrate of output RAPM 190 can be a reflective metal, such as aluminum, that is polished to the correct optical prescription. If the reflector of output RAPM 190 is a reflective metal, such as aluminum, silver, or gold, then the reflector of output RAPM 190 can be over-coated with a protective layer of SiO or SiO2. In this example, the reflectance of the reflective surface of output RAPM 190 is at least 90% over the spectral band of interest, or, in some example preferably greater than 95%, although other percentages may be used in other examples. The substrate of the output RAPM 190 can be a metal such as aluminum or steel, or a non-metallic material, such as glass, or even a specialized low-CTE material such as Zerodur or Invar, although other types and/or numbers of other materials may be used in other examples.

As an aside, the reflective surface of both the source RAPM 160 and the output RAPM 190 can be made planar instead of parabolic, which will significantly reduce their fabrication costs. However, in so doing the source light reflected from the source RAPM 160 will still be diverging and the output light incident upon the output RAPM 190 is necessarily converging as neither RAPM will have optical power and will be unable to collimate or focus, respectively, the incident light. This loss of optical power need not be a problem, however, because additional optical power can be included in the measurement arm chromatic lens 180 and the reference arm chromatic lens 200 to accommodate or otherwise accommodate the loss of power in the mirrors. At the extreme, in some examples it may be desirable to omit the RAPM's completely.

The reference arm chromatic lens 200 is a spectrally dispersive optical element that causes the collimated input reference light 172 incident upon the reference arm chromatic lens 200 to be transmitted through the reference arm chromatic lens 200 in such a way that the light comes to a sharp focus substantially on the optical axis 154 within the reference block 210. Being refractive, the chromatic lens 200 will generally cause longer wavelengths to be brought to a sharp focus further from reference arm chromatic lens 200 than the shorter wavelengths. The distance between the focal points at a longer wavelength (such as 800 nm) and a shorter wavelength (such as 400 nm) can be between 0.01 mm and 100 mm, and it is highly desirable that the relationship between focal distance and wavelength is a substantially linear relationship.

The reference arm chromatic lens 200 can be a singlet lens element, such as a meniscus lens, and can have a prescription wherein a surface is planar, spherical, or aspherical, and can be concave or convex if non-planar, although the reference arm chromatic lens 200 can comprise other types and/or numbers of lens elements in other configurations, such as six or more lens elements, being typically positioned substantially centered on optical axis 154 by way of example. The reference arm chromatic lens 200 can also be a free-form lens, although the reference arm chromatic lens 200 is more generally not free-form and has rotational symmetry about the optical axis 154.

One example of the reference arm chromatic lens 200, whose chromatic performance is matched with the prescription presented for the measurement arm chromatic lens 180 (but takes into account the non-unity refractive index of the reference block 210), has a prescription in which the chromatic lens 200 is a meniscus singlet lens in which the input surface is aspherical with a base radius of curvature of 6.611 mm and a 0.15111 conic constant, the output surface is spherical with a 36.366 mm radius of curvature, a center thickness of 3.5 mm, and is comprising S-TIH3 glass from Ohara Inc., (Kanagawa, Japan). Alternately, instead of the chromatic lens 200, the spectrally dispersive optical element in the reference arm of interferometer 150 can be a diffractive optical element (DOE), such as a holographic optical element (HOE) or even a computer generated holographic optical element.

Figure 6:
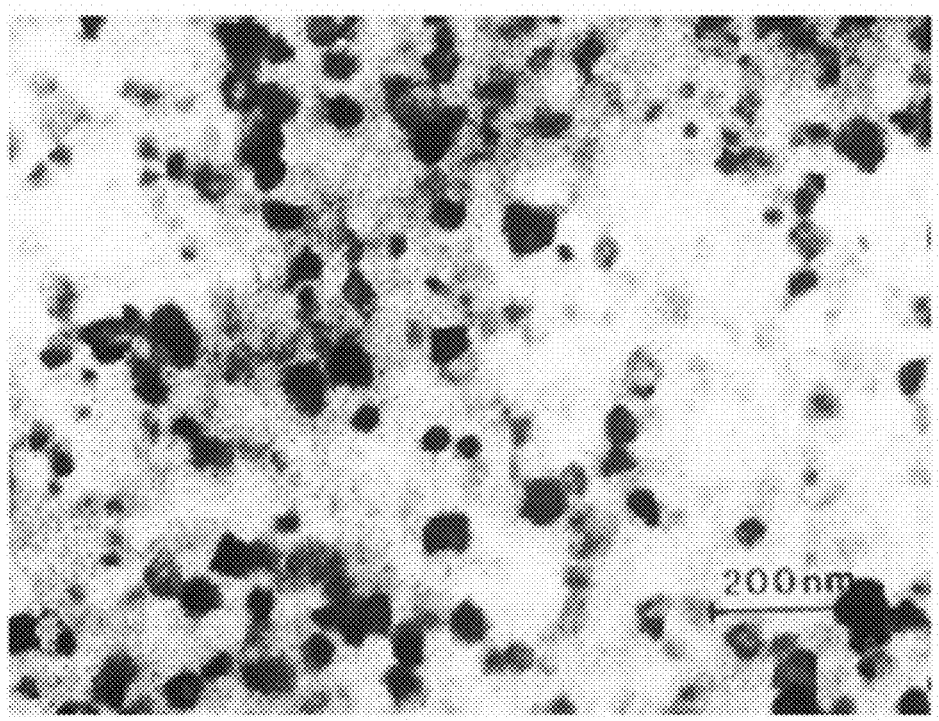
FIG. 6 is a photomicrograph of an example of a Zerodur material.

The reference block 210 is a solid block of material that has bulk-diffusive properties (as opposed to surface-diffusers which will not function well in examples of the claimed technology) and will diffusely reflect or scatter light that is incident upon it into any direction. In this example, the reference block 210 will diffusely scatter the converging chromatic measurement light 212 being focused within the reference block 210 back to the reference arm chromatic lens 200 as diverging chromatic reference light 214 and will also generally diffusely scatter converging chromatic measurement light 212 into the remaining portion of the volume surrounding the reference block 210. The reference block 210 can be a parallelepiped, or can be cylindrically shaped with a length of between 2 mm and 200 mm and a diameter of from 2 mm to 200 mm. The reference block 210 may comprise a glass-ceramic composite material, such as Zerodur in which sub-micron sized particles are distributed within a glass matrix, as shown in the photomicrograph of FIG. 6, wherein the particles, having a refractive index different than the surrounding glass, will diffusely scatter any light propagating through the material. Alternately, the reference block 210 may comprise a polymer, many of which, such as nylon, polyester, Teflon, acetal, polyethylene, polystyrene, and polypropylene, are inherently bulk-diffusive, although other types and/or numbers of materials in other examples may be used. The light scattering can be caused by naturally-occurring atomic or molecular scattering elements within the medium for the reference block 210, or the scattering can be caused by light-scattering particulates added to a normally non-scattering material.

Referring to FIGS. 3-5B, in this example the test surface 90 is the surface whose displacement, or distance, from the interferometer 150, or a reference point on the interferometer 150, such as the apex of the lower surface of the measurement arm chromatic lens 180, is to be measured, although other types of surfaces may be measured. The interferometer system 100 is generally capable of measuring the displacement at only one location on the test surface 90, such as at measurement spot 112, at a time, and therefore in order to measure the topography of the test surface 90 the interferometer 150 in this example is translated across test surface 90 in at least one, but in some example preferably two, axis. Note that if the maximum to minimum displacement of the topography of test surface 90 exceeds the working measurement range of the interferometer system 100 then the interferometer 150 will have to translate in the vertical direction as well during the scanning to accommodate the wide variations in displacement.

By way of example only, the test surface 90 can be a surface of a relatively small object, having a measurement width as small as 1 mm, or a surface of a relatively large object having a width as large as ten meters, although surfaces with other dimensions may be measured. The test surface 90 can be highly polished, such as a telescope mirror, or have a texture, although the test surface can have other surface characteristics in other examples. The test surface 90 can be a metallic surface, such as aluminum, gold, silver, or silicon, or a non-metallic surface such as glass or even polymer, although types and/or numbers of materials can be used for the test surface 90. The test surface 90 can be smooth and free of discontinuities or other abrupt changes in elevation, or it can have discontinuities, either of which can be readily measured by examples of the claimed technology.

The test surface 90 can be substantially perpendicular to the optical axis 154 that extends through interferometer 150, or the test surface 90 can be tilted with respect to optical axis 154 up to 60 degrees (in any direction about optical axis 154) or even up to 80 degrees in other examples. As such, the light back-reflected or back-scattered from the test surface 90 back into the interferometer 150 through the measurement arm chromatic lens 180, such as the diverging chromatic test light 186, can be either diffusely or specularly reflected from the test surface 90, and can be between 0.000001% and 99.99% of the converging chromatic test light 182 directed onto the test surface 90.

The output fiber 114 is used to couple the light signal output by the interferometer 150 to an input of the spectrograph 116. The output fiber 114 is in this example a single-mode fiber, having a core diameter less than 10 µm, or in other examples less than 5 µm, and transmits all wavelengths of light that are used by the interferometer 150, such as from 400 nm to 800 nm, to the spectrograph 116 with minimal attenuation, although optical fibers with other characteristics may be used. Additionally, since the light utilized and output by the interferometer 150 can be polarized, the output fiber 114 in this example has polarization-preserving or polarization-maintaining properties. Further, the spectrograph 116 and accompanying camera 118 that are heat generating, the spectrograph 116 and accompanying camera 118 are placed a sufficient distance from the interferometer 150 so the performance of the interferometer 150 is not affected by these adjacent heat sources. In this example, the length of output fiber 114 to provide sufficient distance is at least one meter, or in some example preferably at least two meters, provided the length does not significantly attenuate any of the wavelengths of light output by the interferometer 150.

The spectrograph 116 is an optical instrument that is used to spectrally disperse an optical signal into a spectrum of wavelengths, such that the constituent wavelengths, which are generally unknown but are desired to be known, within the optical signal can be analyzed. Spectra produced by spectrograph 116 is coupled to an input of camera 118 that captures imagery of the spectra produced by the spectrograph 116. That is, the output of the spectrograph 116 is an optical signal being presented as intensity as a function of wavelength, and an image of this optical signal is subsequently presented to camera 118 which captures the image, converts the image to an electronic format, and transmits the electronically formatted spectral image to the digital processing system 120 for processing. The spectrograph 116 nominally has the same spectral bandwidth as the free spectral range, or chromatic range, of the interferometer 150, such as the 400 nm to 800 nm spectral range cited earlier. The spectral resolution of the spectrograph 116 in this example is fine enough that the individual interference fringes within the wavelet interferogram of FIG. 8 can be resolved. Therefore, the resolution of the spectrograph 116 can be better than 100 pm (picometers), or in some example preferably less than 50 pm, or in other examples better than 20 pm. One such spectrograph that meets these requirements is the Hornet Hyperfine Spectrometer from LightMachinery Inc., Ottawa, Ontario, Canada.

The camera 118 captures an image of the optical signal or spectrum created by the spectrograph 116 and converts the image to an electronic format. In this example, the camera 118 is a line camera, wherein the image sensor of the camera 118 comprises a row of pixels arranged linearly, and onto which a spectral image is projected by spectrograph 116. In such a case, there can be between 256 and 16,384 pixels in the image sensor whose length can be up to 100 mm, and the imaging frame rate can be up to 200,000 captured images per second.

In other examples, the spectrograph 116 and camera 118 may be operative with two-dimensional spectral images. In this two-dimensional example, the camera 118 can have an image sensor whose pixels are arranged in a two-dimensional array wherein the pixel count can be from 640×480 pixels up to 10,000×5000 pixels, the size of the image sensor can be from 3.2 mm×2.4 mm up to 50 mm×25 mm, and the frame rate can be between 10 images/second up to 50,000 images/second. The camera 118 in this example is a monochrome camera (as opposed to color) and has a gray-scale bit depth of from 8 bits up to 20 bits, although other types of cameras may be used. The output of camera 118 is coupled to an input of a digital processing system 120.

The digital processing system 120 may include one or more processors, a memory, and/or a communication interface, which are coupled together by a bus or other communication link, although the digital processor system 120 can include other types and/or numbers of elements in other configurations and also other types of processing systems may be used. The processor(s) of digital processor system 138 may execute programmed instructions stored in the memory for the any number of the functions described and illustrated herein. The processor(s) of digital processor system 120 may include one or more CPUs or general purpose processors with one or more processing cores, for example, although other types of processor(s) can also be used although the digital processor system 120 may comprise other types and/or numbers of components and/or other elements in other configurations.

The memory of the digital processor system 120 stores these programmed instructions for one or more aspects of the present technology as described and illustrated herein, such as for generating spectral content values of light output by interferometer 150 and for determining displacement or some other property of test surface 90 or a test object as described and illustrated herein for execution by the processing unit by way of example, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

The communication interface of the digital processor system 120 operatively couples and communicates to the spectrograph 116 and to the camera 118 by a communication system, although other types and/or numbers of communication systems with other types and/or numbers of connections and/or configurations to other devices and/or elements can also be used.

By way of example only, the digital processing system 120 also could be a conventional microprocessor with an external memory or the digital processing system 120 can be a microcontroller with all memory located onboard. In another example, the digital processing system 120 could be a digital signal processor (DSP) integrated circuit, which is a microcomputer that has been optimized for digital signal processing applications, including centroid computations, regression, and curve-fitting. In yet another example, the digital processing system 120 could be a graphical processing unit (GPU) integrated circuit, which is a microcomputer that has been optimized for parallel-processing applications. The digital processing system 120 could be as simple as a sixteen bit integer device for low-cost applications or the digital processing system 120 can be a thirty-two bit or sixty-four bit or higher floating point device or system for higher performance when cost is not an issue. Also, by way of example only, the digital processing system 120 could be an FPGA (Field-programmable gate array) or a CPLD (complex programmable logic device) which are attractive for use in examples of this technology owing to their compact and cost-effective hardware implementations.

Examples of one or more portions of the claimed technology as illustrated and described by way of the examples herein may also be embodied as one or more non-transitory computer readable media having instructions stored thereon for one or more aspects of the present technology, such as the memory of the digital processor system 120. The instructions in some examples include executable code that, when executed by one or more processors, such as the processor(s) of the digital processor system 120, cause the one or more processors to carry out steps necessary to implement the methods of the examples of this technology that are described and illustrated herein The interferometer system output 122 is an electronic signal line that couples an output of digital processing system 120 to an input of a downstream electronic device such as a client computer or a display (not shown). As such interferometer system output 122 is typically a serial bus such as USB or SPI bus, for inter-computer communications, or HDMI in the case where the downstream electronic device is a display. The data communicated through interferometer system output 122 bus can be the displacement measured by interferometer system 100, as well as other data, such as meta-data, about the displacement measurement process.

An example of a method for measuring displacement with the interferometer system 100 will now be described with reference to FIGS. 3-5B. Referring to FIG. 3, a light source comprising the laser driver 102 and the fiber laser 104 outputs broadband light from the fiber laser 104 which then enters the filter assembly 106.

In this example, the filter assembly 106 removes unwanted wavelengths from the broadband light, such as those from 800 nm to 2400 nm, although the filter assembly could provide other types of filtering. The filter assembly 106 also can remove unwanted polarizations from the source light, such that the light, for example, that exits filter assembly 106 is linearly polarized by way of example. The filtered light that exits the filter assembly 106 is transmitted through source fiber 108 to an input port of the source arm associated with the interferometer 150.

Referring now to FIGS. 4, 5A, and 5B, filtered light that exits source fiber 108 is shown as diverging source light 152, whose divergence is due primarily to the light being diffracted as it exits from the 5 µm diameter aperture of single mode source fiber 108. The diverging source light 152 is incident on the source RAPM 160 which collimates the light and also reflects the collimated light 90 degrees such that the collimated reflected light becomes incident on two mirrored sides of beamsplitter 170, namely input surface 170A and input surface 170B, although other configurations could be used in other examples.

As shown in greater detail in FIG. 5A, the upper portion of the reflected collimated light beam is upper source beam 162, which reflects from input surface 170A into input reference light 172 such that input reference light 172 is incident on reference arm chromatic lens 200. The reference arm chromatic lens 200 then causes the input reference light 172 to come to a sharp focus within the reference block 210 through converging chromatic reference light 212. Note, however, that since the reference arm chromatic lens 200 is designed to be highly dispersive, the sharp focus for each wavelength occurs at a different position on the optical axis 154 within reference block 200. For example, longer wavelength light, such as light having a wavelength of 800 nm, is shown coming to a focus at long wavelength focal position 215 while shorter wavelength light, such as light having a wavelength of 400 nm, is shown coming to a focus as short wavelength focal position 213.

The reference block 200 comprising a bulk-diffusive material, will diffuse or otherwise scatter the light propagating within it, including the light that is brought to a sharp focus along optical axis 154. In this example, light that is brought to a focus along optical axis 154, including that light at the long wavelength focal position 215, the short wavelength focal position 213, and all positions there-between, has a portion of its light back-scattered into the diverging chromatic reference light 214 which subsequently becomes incident on reference arm chromatic lens 200. The reference arm chromatic lens 200 then collimates and effectively de-achromatizes the diverging chromatic reference light 214 and outputs the output reference light 174 which then becomes incident on the mirrored output surface 170C of the beamsplitter 170.

The output reference light 174 is reflected from output surface 170C into reflected output reference light 194, which is still collimated, which is then incident on the output RAPM 190. The output RAPM 190 then both causes the collimated reflected output reference light 194 to come to a focus, and reflects the reflected output reference light 194 into a direction such that the reflected light, converging output light 192, comes to a sharp focus at the entrance aperture of the output fiber 114.

Note that all of the wavelengths of light present in the light output by the filter assembly 106 are also present in the light entering output fiber 114 from the reference arm of interferometer 150 and is a feature of examples of the claimed technology provided by the reference block 210. Further, this broadband output reference light that enters output fiber 114 propagates through output fiber 114 to spectrograph 116.

The spectrograph 116 spectrally disperses all the wavelengths of the broadband reference light and projects the spectrum onto the image sensor of the camera 118. This reference light is then available to produce interference fringes on the image sensor of the camera 118 with any dispersed light from the measurement arm that is concurrently projected onto the image sensor.

As mentioned earlier, the diverging source light 152 is incident on the source RAPM 160 which collimates the light and also reflects the collimated light 90 degrees such that the collimated reflected light becomes incident on two mirrored surfaces of the beamsplitter 170, namely the input surface 170A and the input surface 170B. As shown in greater detail in FIG. 5A, the lower portion of the reflected collimated light beam is the lower source beam 164, which reflects from the input surface 170B into the input measurement light 176 such that the input measurement light 176 is incident on the measurement arm chromatic lens 180. The measurement arm chromatic lens 180 then causes the input measurement light 176 to come to a sharp focus along optical axis 154 in the measurement space through the converging chromatic measurement light 182. Note, however that since measurement arm chromatic lens 180 is designed to be highly dispersive, the sharp focus for each wavelength occurs at a different position on the optical axis 154 at or near the test surface 90. For example, longer wavelength light, such as light having a wavelength of 800 nm, is shown coming to a focus at a long wavelength focal position 185 while a shorter wavelength light, such as light having a wavelength of 400 nm, is shown coming to a focus at the short wavelength focal position 183.

The test surface 90 will reflect or back-scatter a portion (i.e., that portion that was not absorbed or transmitted) all light incident upon it, including the light that is brought to a sharp focus along optical axis 154 at measurement spot 112. A portion of light from measurement spot 112 is back-reflected as diverging chromatic measurement light 186 which subsequently becomes incident on the measurement arm chromatic lens 180. The measurement arm chromatic lens 180 collimates and effectively de-achromatizes the diverging chromatic measurement light 186 and outputs the output measurement light 178 which then becomes incident on the mirrored output surface 170D of the beamsplitter 170. The output measurement light 178 is reflected from the mirrored output surface 170D into the reflected output measurement light 196, which is still collimated, which is then incident on the output RAPM 190.

The output RAPM 190 causes the collimated reflected output measurement light 196 to come to a focus, and reflects the reflected output measurement light 196 into a direction such that the reflected light, part of converging output light 192, comes to a sharp focus at the entrance aperture of the output fiber 114. Note, however, unlike the reference arm light, the light entering output fiber 114 from the measurement arm is nearly monochromatic because in this example: (1) only a narrow band of wavelengths of converging chromatic light 182 is in focus at measurement spot 112 on test surface 90, where the center value of the wavelengths is a direct function of the displacement of test surface 90 along optical axis 154; and (2) of all the light back-reflected from test surface 90, whether in focus or not at the displacement of the test surface 90, only that light originating at the measurement spot 112 will be in sharp focus at the entrance aperture of and actually enter the output fiber 114.

Between these two focus mechanisms the optical bandwidth of the measurement light actually entering output fiber 114 is on the order of a few nanometers. This measurement arm wavelength selectivity is also one of the advantages of examples of the claimed technology. In this example, the narrower the spectral bandwidth of the measurement light entering the output fiber 114, the narrower the envelope of the spectral fringe wavelet (see for example FIG. 8) and the better the localization and determination of the parameters of the wavelet, and the better the determination of the displacement of test surface 90 or some other property of a test object. The narrowband output measurement arm light that enters the output fiber 114 propagates through the output fiber 114 to the spectrograph 116.

The spectrograph 116 spectrally disperses the narrowband measurement light and projects the spectrum onto the image sensor of the camera 118. This measurement light interferes and produces interference fringes on the image sensor of the camera 118 with the dispersed light from the reference arm that is concurrently projected onto the image sensor. Note, in this example another requirement for interference to occur is that the two interfering beams in this example are of substantially the same polarization, which occurs in examples of the claimed technology by virtue of the polarizing filter in filter assembly 106 and the polarization-preserving properties of the source fiber 108 and the output fiber 114.

In this example, another requirement to produce high contrast interference fringes is that the two interfering beams are coherent with one another, which means that the optical path difference (OPD) between the lengths of the propagation paths of the two interfering beams (namely the measurement arm path and the reference arm path) is less than the coherence length of the light being interfered.

As shown in FIG. 5B, the OPD is the optical path length of the reference arm (OPLR) minus the optical path length of the measurement arm (OPLM) within the interferometer. Note that the path lengths are the same in the source arm and in the output arm since the paths are the same. In this example, the OPLR is the optical distance from the centerline 155 to the reference spot 217 and the OPLM is the optical distance from the centerline 155 to the measurement spot 112 where OPLM can be further subdivided into the sum of a constant optical path length (OPLK) that extends from centerline 155 to an arbitrary reference point, such as the vertex of the measurement chromatic lens 180 and D. The displacement to be determined by interferometer system 100 can extend from the arbitrary reference point at the terminus of OPLK to the elevation of test surface 90 at measurement spot 112, where the centerline 155 is that line that passes through a center of the RAPM 190 as well as the center of the beamsplitter 170. For interference to occur:

$$\text{OPD} = |\text{OPLM} - \text{OPLR}| < \text{Coherence length} \quad \text{Equation 1}$$

The coherence length is a function of the spectral bandwidth of the light beams that are interfering, which in examples of the claimed technology is dictated by the spectral resolution of the spectrograph 116. The formula for coherence length is:

$$\text{Coherence length} = \frac{2\ln 2}{\pi} \times \frac{\lambda^2}{BW} \quad \text{Equation 2}$$

where $\lambda$ is the center wavelength of the interfering light and BW is the spectral bandwidth of the interfering light. The coherence length, $\lambda$, and BW all have units of microns. As an example, if $\lambda = 0.5$ μm, if the resolution of the spectrograph 116 is 0.0001 μm (100 pm), then the coherence length is 1103 μm, which means the maximum displacement measurement range is approximately ±1.1 mm from its midpoint or 2.2 mm total. Providing the reference block 210 as described with the examples herein, with a widely separated distance between the short wavelength focal position 213 and the long wavelength focal position 215, allows the displacement measuring working range (i.e., the range of displacement, D, over the interferometer system 100 can measure) to be greatly increased commensurately.

As mentioned above the reflected output reference light 194 and the reflected output measurement light 196 are both focused and reflected onto the entrance aperture of the output fiber 114 which transmits the two light signals to the spectrograph 116 which spectrally disperses them and projects them onto the image sensor of the camera 118 where they interfere and form an interference signal, or spectral interferogram, on the image sensor of the camera 118. Equation 3, below, symbolically $$I_T(\lambda) = I_R + A_M e^{-\frac{1}{2}\left(\frac{\lambda-\lambda_c}{\sigma}\right)^2} + 2\sqrt{I_R A_M e^{-\frac{1}{2}\left(\frac{\lambda-\lambda_c}{\sigma}\right)^2}} \cos\left(\frac{2\pi OPD}{\lambda}\right) \quad \text{Equation 3}$$

describes the spectral interferogram, where $I_T(\lambda)$ is the total intensity of brightness at a given wavelength, $I_R$ is a substantially constant term due to the light back-reflected from the reference block 210 (i.e., diverging chromatic reference light 214), $A_M$ represents the amplitude of the light reflected from the test surface (i.e., diverging chromatic measurement light 186) the third (Gaussian) term is the spectral envelope of a non-interfering portion of light back-reflected from the test surface (i.e., diverging chromatic measurement light 214), and the final term represents the interference between the reference arm and measurement arm light signals. Equation 3 is illustrated graphically as the wavelet function in FIG. 8. The product of $I_R$ times $A_M$ within the square root of Equation 3 represents interferometric gain, especially if $I_R$ is much greater than $A_M$ (which is usually the case when the test surface 90 is uncooperative) which in turn greatly increases the amplitude of the cosine with the result that the fringes have a larger amplitude on the image sensor of the camera 118. Note that larger signal amplitudes on the image sensor of camera 118 can also translate to faster shutter speeds for the camera 118 and in turn can lead to faster displacement measurement rates of examples of the claimed technology. Nonetheless, the primary quantity of interest in Equation 3 is OPD, which includes the displacement quantity, D, to be determined. Continuing from Equation 1:

$$\text{OPD} = \text{OPLR} - (\text{OPLK} + D) \quad \text{Equation 4}$$

and after rearranging terms:

$$D = \text{OPD} - \text{OPLR} + \text{OPLK}. \quad \text{Equation 5}$$

Since OPLK is a constant, OPD is determined during the processing operations executed by the digital processing system 120, and the relationship between OPLR and OPLM is known a priori by way of a calibration process, then the displacement D can be found by a determination of OPD in Equation 3.

After the digital processing system 120 determines the displacement D from the spectral image data electronically communicated to the digital processing system 120 from an output of the camera 118, the digital processing system 120 can then transmit displacement data to a user or a remote computing device through the interferometer system output 122.

Figure 8:
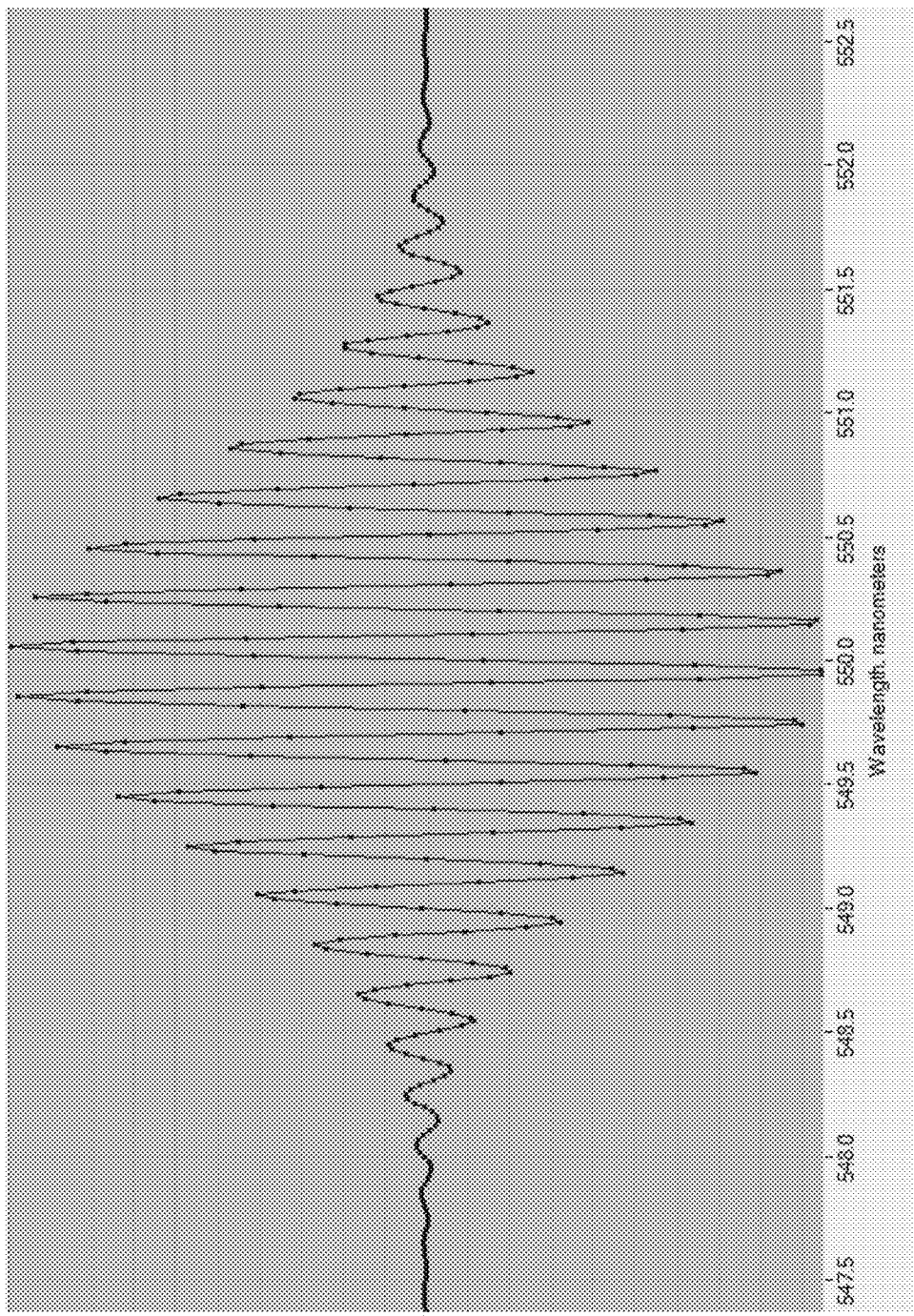
FIG. 8 is a spectral plot of an example of an interference pattern at the image sensor of spectral interferometer shown in FIG. 4 where a test sample is an optical surface.

Returning to Equation 3, if the reference arm was absent and the reflected output reference light 194 did not exist, then there would be no interference occurring at the image sensor of the camera 118 and the curve of FIG. 8 would be a simple Gaussian curve according to Equation 6:

$$I(\lambda) = A_M e^{-\frac{1}{2}\left(\frac{\lambda-\lambda_c}{\sigma}\right)^2} \quad \text{Equation 6}$$

in which case the displacement is found by determining the location of the peak of the Gaussian curve at $\lambda_c$, which is generally accurate to a few microns of displacement error (this is essentially the configuration of the prior art discussed in connection with FIG. 1). However, with the addition of the cosine term of Equation 3 caused by the reference arm signal, the wavelet waveform of FIG. 8 can be further processed by a more sophisticated algorithm, such as a least squares fitting algorithm, executing within the digital processing system 120 to find the value of the displacement to less than a nanometer, or even better, which is a key benefit of examples of the claimed technology. Further, if the displacement measuring range, defined by the distance between long wavelength focal position 185 and short wavelength focal position 183 along optical axis 154 is greater than 1 mm, and the displacement measurement performance (performance defined to be either accuracy and/or repeatability) is one nanometer, then the ratio of range to performance of examples of the claimed technology can be greater than or equal to 1,000,000.

Figure 9:
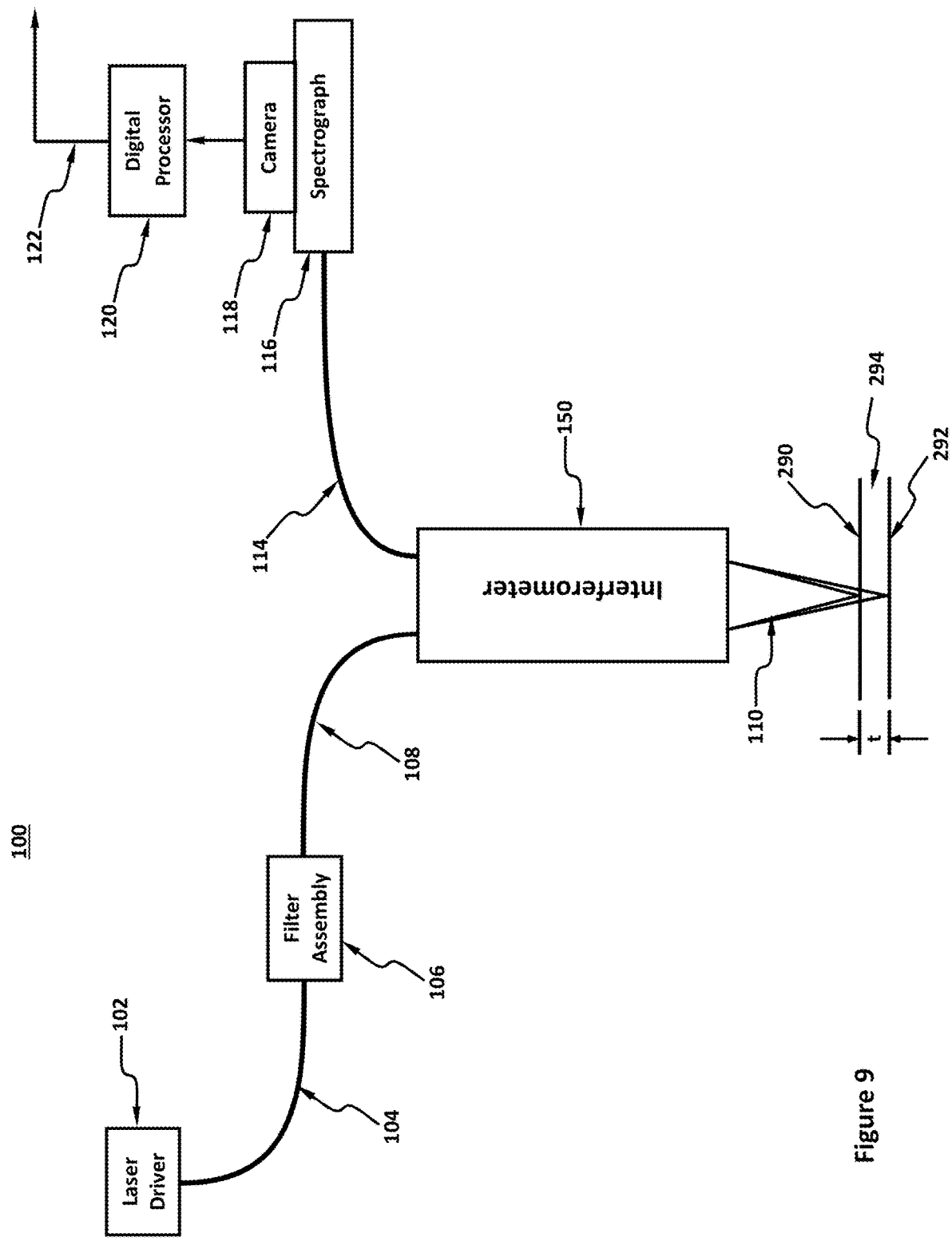
FIG. 9 is a diagram of the example of the spectral interferometer system shown in FIG. 3 where a test sample has two surfaces.
Figure 11:
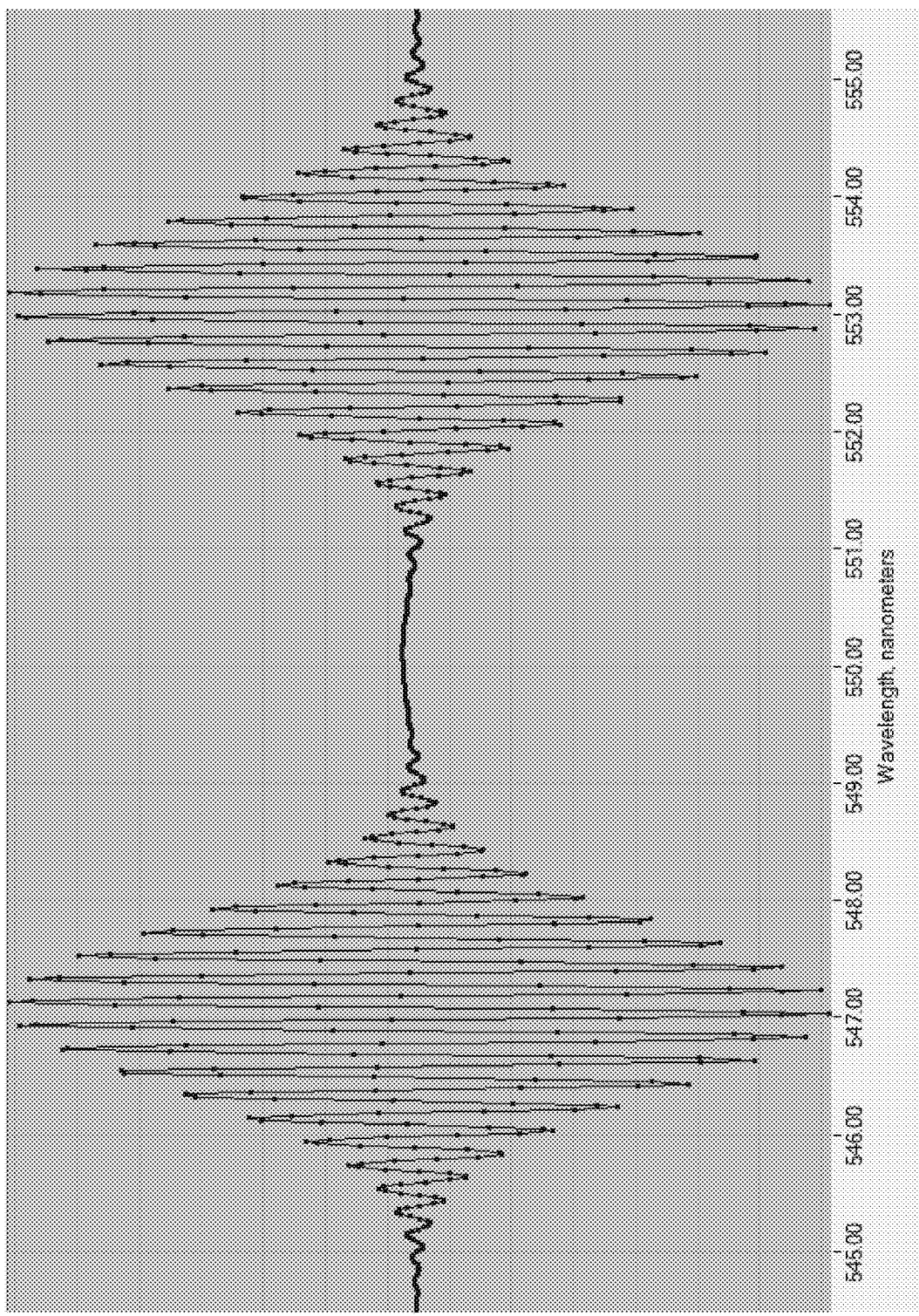
FIG. 11 is a spectral plot of an example of an interference pattern at the image sensor of the spectral interferometer system shown in FIG. 3 where a test sample has two surfaces.

A few examples of other variations of the claimed technology are illustrated and described below. For example, as shown in FIG. 9, instead of there being a single test surface, such as test surface 90, there can be multiple test surfaces, such as upper test surface 290 and lower test surface 292 separated by a medium 294 having a refractive index and a thickness "t", wherein the interferometer system 100 can be used to determine the thickness t, as long as the displacement of the upper test surface 290 is greater than the displacement associated with the short wavelength focal position 183 (of FIG. 5A) and as long as the displacement of the lower test surface 292 is less than the displacement associated with the long wavelength focal position 185. When two such test surfaces are present, the resulting spectral interferogram will be as illustrated in the example in FIG. 11 and will comprise two wavelet patterns which are processed by a digital processor system 120 to determine their respective OPD's and displacement. Note that the refractive index of the medium 294 in this example is taken into account during the wavelet processing for the lower test surface 292 as the chromatic light 110 passes through it in order to reach the lower test surface 292. Alternately, if the refractive index of the medium 294 is unknown and the thickness "t" of the medium 294 is known, the refractive index of the medium 294 can then be determined with great precision with interferometer system 100.

Figure 10:
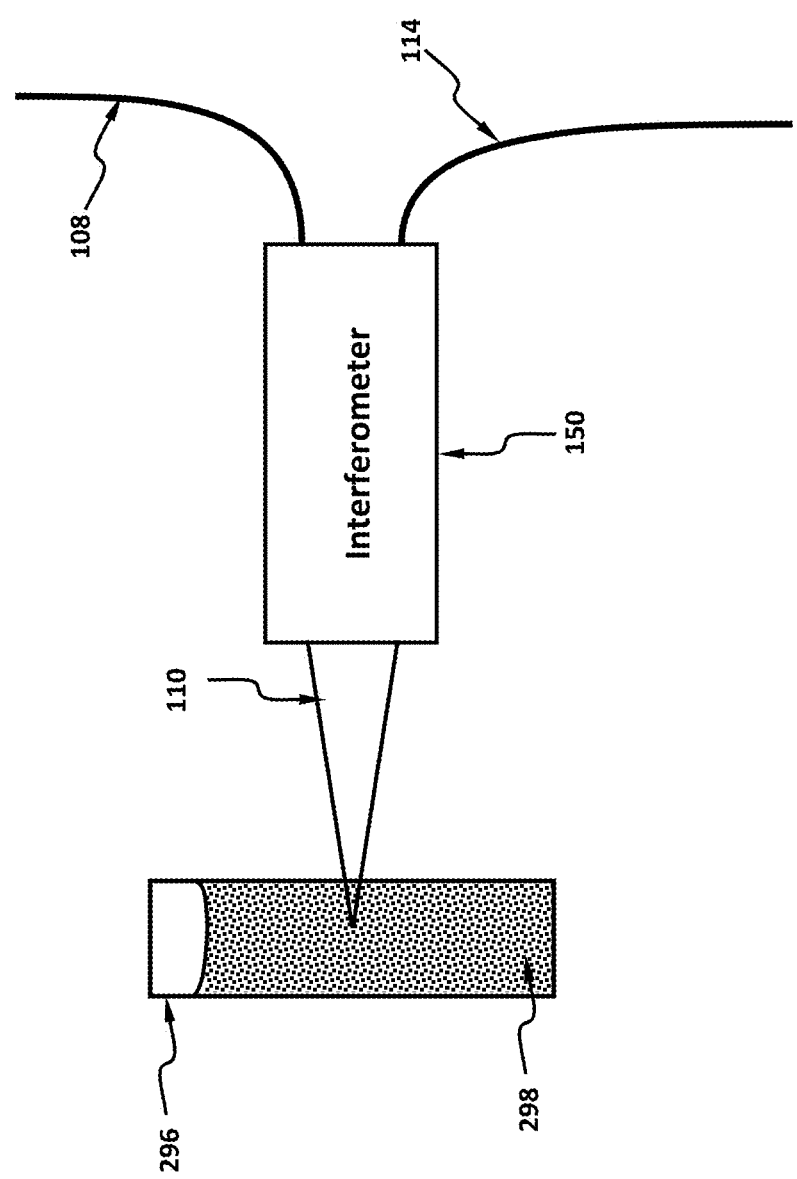
FIG. 10 is a diagram of the example of the spectral interferometer system shown in FIG. 3 where a test sample is a volume contained in a cuvette.

Additionally, instead of there being just one or two surfaces, there can be three or more surfaces in the sample volume of the interferometer 150 along the optical axis 154. For example, as shown in FIG. 10, the interferometer 150 is used to measure the displacement of various objects within a test medium 298 within a cuvette 296. Further, if the cuvette 296 along with a medium 298 within the cuvette 296 is translationally scanned laterally within the chromatic light 110, or in some example preferably the interferometer 150 is translationally scanned across the cuvette 296, then when a multitude of displacement measurements are made by the interferometer system 100 of the objects within the medium 298 a complete and detailed three-dimensional image of the objects within the medium 298 can be produced.

Example of objects or artifacts that can be measured or 3D-imaged by examples of the claimed technology that can be in the medium 298 of the cuvette 296 can include biological samples such as larval fish, algae, plankton, and other single and multicellular organisms. The medium 298 can be a solid, a liquid, or gaseous, and if the medium 298 is a liquid can be organic or aqueous and if the medium 298 is gaseous can be air, partially evacuated air, or a noble gas by way of example. Alternately, the cuvette 296 can be dispensed with, and the medium can be a solid article of manufacture in which case the object within the medium can be an objectionable crack, bubble, defect, or inclusion, and the three-dimensional scanning process amounts to a non-destructive (subsurface) test of an article of manufacture. Lastly, the test object can be a sample of tissue, such as human tissue, in which the interferometer system 100 is used, again in scanning mode, to generate a detailed three-dimensional image of the sub-surface structure and organelles below the surface of the tissue sample.

Other benefits of examples of the claimed technology are that the longitudinal depth of field, the lateral resolution, and the longitudinal accuracy are not coupled to one another. In this example, the depth of field is determined by the distance from the longitudinal position of the short wavelength focal position 183 to the longitudinal position of long wavelength focal position 185, the lateral resolution is determined by the width of measurement spot 112 (for each wavelength) of chromatic light 110, and the longitudinal accuracy is determined by the accuracy performance of the processing of Equation 3.

Another benefit of examples of the claimed technology is the ability to process weak optical signals, such as occur when the test surface 90 is highly sloped and non-diffusive (i.e., most of the converging chromatic measurement light 182 is reflected by the test surface 90 away from the chromatic lens 180), absorptive, or otherwise uncooperative; when a 3D test object has weak optical reflections from surfaces deep within the 3D test object; or when the displacement is relatively large. In each case—and others—the diverging chromatic measurement light 186 can comprises as few as only a couple dozen photons per measurement time yet because of the interference gain term of Equation 3 the spectral interference pattern can still be discernable and processed to yield accurate displacement measurements.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, such as arrows in the diagrams therefore, is not intended to limit the claimed processes to any order or direction of travel of signals or other data and/or information except as may be specified in the claims. Accordingly, the invention is limited only by the following claims and equivalents thereto.

What is claimed is:

1. An interferometer system comprising:
   a measurement arm comprising a measurement chromatic lens positioned to direct measurement chromatic light towards a fixed target and direct detected measurement light resulting from the measurement chromatic light towards an output system; and
   a reference arm comprising a reference optic positioned to receive reference light and direct detected reference light resulting from reference light towards the output system;
   wherein the measurement arm and the reference arm further comprise a non-transmissive reflective structure with two or more surfaces configured and positioned to direct a received portion of source light towards the measurement arm along a measurement path and another received portion of the source light towards the reference arm along a measurement path that is non-overlapping with the measurement path;

wherein the non-transmissive reflective structure with two or more fixed surfaces comprises measurement mirrored surfaces and reference mirrored surfaces, wherein an axis extends between the measurement mirrored surfaces and between the reference mirrored surfaces;

wherein one of the measurement mirrored surfaces on one side of the axis is positioned to direct the received portion of source light towards the measurement dispersive optical system for the measurement chromatic light and wherein another one of the measurement mirrored surfaces on an opposing side of the axis is positioned to direct the detected measurement light received towards the output system;

wherein one of the reference mirrored surfaces on one side of the axis is positioned to direct the another received portion of the source light towards the reference optic for the reference chromatic light and wherein another one of the reference mirrored surfaces on an opposing side of the axis is positioned to direct the detected reference light received towards the output system comprising a processor configured to determine at least one measured property of the fixed target from the detected measurement light and the detected reference light.

2. The system as set forth claim 1 wherein the reference arm further comprises a bulk diffuser object and the reference optic further comprises a reference chromatic lens positioned to direct the reference chromatic light towards the bulk diffuser object, receive the chromatic reference light from the bulk diffuser object, and direct the detected reference light from the received chromatic reference light towards the output system.

3. The system as set forth claim 2 wherein the bulk diffuser object comprises a polymer which has bulk-diffusive properties or a glass-ceramic composite material has bulk-diffusive properties.

4. The system as set forth in claim 1 wherein the output system further comprises:
a spectrograph with an image sensor coupled to receive the detected measurement light and the detected reference light and generate spectral image data; and
wherein the processor is coupled to the image sensor and is configured to receive and process the generated spectral image data to determine the at least one measured property of the fixed target.

5. The system as set forth in claim 1 further comprising:
an input optical system comprising at least one input optical element positioned to direct the source light towards the one of the measurement mirrored surfaces and the one of the reference mirrored surfaces on one side of the axis; and
an output optical system comprising at least one output optical element positioned to direct the detected measurement light from the another one of the measurement mirrored surfaces and the detected reference light from the another one of the reference mirrored surfaces to the output system.

6. The system as set forth in claim 5 wherein:
the input optical element comprises an input right angle parabolic mirror and the output optical element comprises an output right angle parabolic mirror; and
the non-transmissive reflective structure comprises a beamsplitter.

7. The system as set forth in claim 5 further comprising a light source positioned to direct the source light towards the input optical system, wherein the light source comprises a laser driver coupled to a fiber laser comprising a single-mode fiber with a core diameter and exit aperture diameter of less than 10 µm.

8. The system as set forth in claim 7 further comprising a filter assembly coupled in the light source to filter at least one property of the source light from the laser driver, wherein the at least one property comprises at least one of one or more wavelengths or one or more polarizations.

9. A method for making an interferometer system, the method comprising:
positioning a measurement arm comprising a measurement chromatic lens configured to direct measurement chromatic light towards a fixed target and direct detected measurement light from the received measurement chromatic light towards an output system; and
providing a reference arm comprising a reference optic positioned to receive reference light and direct detected reference light resulting from received reference light towards the output system;
wherein the measurement arm and the reference arm further comprise a non-transmissive reflective structure with two or more surfaces configured and positioned to direct a received portion of source light towards the measurement arm along a measurement path and another received portion of the source light towards the reference arm along a measurement path that is non-overlapping with the measurement path;
wherein the non-transmissive reflective structure with two or more surfaces comprises measurement mirrored surfaces and reference mirrored surfaces, wherein an axis extends between the measurement mirrored surfaces and between the reference mirrored surfaces;
wherein one of the measurement mirrored surfaces on one side of the axis is positioned to direct the received portion of source light towards the measurement dispersive optical system for the measurement chromatic light and wherein another one of the measurement mirrored surfaces on an opposing side of the axis is positioned to direct the detected measurement light received towards the output system;
wherein one of the reference mirrored surfaces on one side of the axis is positioned to direct the another received portion of the source light towards the reference optic for the reference chromatic light and wherein another one of the reference mirrored surfaces on an opposing side of the axis is positioned to direct the detected reference light received towards the output system comprising a processor is configured to determine at least one measured property of the fixed target from the detected measurement light and the detected reference light.

10. The method as set forth claim 9 wherein the reference arm further comprises a bulk diffuser object and the reference optic further comprises a reference chromatic lens positioned to direct the reference chromatic light towards the bulk diffuser object, receive the chromatic reference light from the bulk diffuser object, and direct the detected reference light from the received chromatic reference light towards the output system.

11. The method as set forth claim 10 wherein the bulk diffuser object comprises a polymer which has bulk-diffusive properties or a glass-ceramic composite material has bulk-diffusive properties.

12. The method as set forth in claim 9 wherein the output system further comprises:
   a spectrograph with an image sensor coupled to receive the detected measurement light and the detected reference light and generate spectral image data; and
   wherein the processor is coupled to the image sensor and is configured to receive and process the generated spectral image data to determine the at least one measured property of the fixed target.

13. The method as set forth in claim 9 further comprising:
   providing an input optical system comprising at least one input optical element positioned to direct the source light towards the one of the measurement mirrored surfaces and the one of the reference mirrored surfaces on one side of the axis; and
   providing an output optical system at least one output optical element positioned to direct the detected measurement light from the another one of the measurement mirrored surfaces and the detected reference light from the another one of the reference mirrored surfaces to the output system.

14. The method as set forth in claim 13 wherein:
   the input optical element comprises an input right angle parabolic mirror and the output optical element comprises an output right angle parabolic mirror; and
   the non-transmissive reflective structure comprises a beamsplitter.

15. The method as set forth in claim 13 further comprising positioning a light source to direct the source light towards the input optical system, wherein the light source comprises a laser driver coupled to a fiber laser comprising a single-mode fiber with a core diameter and exit aperture diameter of less than 10 μm.

16. The method as set forth in claim 15 further comprising coupling a filter assembly in the light source to filter at least one property of the source light from the laser driver, wherein the at least one property comprises at least one of one or more wavelengths or one or more polarizations.

* * * * *